US008475260B2

(12) United States Patent
Yoshizawa et al.

(10) Patent No.: US 8,475,260 B2
(45) Date of Patent: Jul. 2, 2013

(54) GAMING MACHINE AND METHOD FOR CONTROLLING THE SAME

(75) Inventors: Kazumasa Yoshizawa, Koto-ku (JP); Hiromoto Yamauchi, Koto-ku (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 316 days.

(21) Appl. No.: 12/790,155

(22) Filed: May 28, 2010

(65) Prior Publication Data

US 2010/0304836 A1 Dec. 2, 2010

(30) Foreign Application Priority Data

Jun. 1, 2009 (JP) ................................ 2009-132497

(51) Int. Cl.
*G06F 17/00* (2006.01)

(52) U.S. Cl.
USPC ............................................. 463/20; 463/16

(58) Field of Classification Search
USPC ..................................................... 463/16–20
See application file for complete search history.

(56) References Cited

U.S. PATENT DOCUMENTS

| | | | | |
|---|---|---|---|---|
| 6,012,983 | A | 1/2000 | Walker et al. | |
| 6,796,903 | B1 * | 9/2004 | Bryant | 463/20 |
| 6,960,133 | B1 | 11/2005 | Marks et al. | |
| 7,604,540 | B2 * | 10/2009 | Olive | 463/27 |
| 7,867,077 | B2 * | 1/2011 | Baerlocher et al. | 463/20 |
| 2005/0054429 | A1 * | 3/2005 | Baerlocher et al. | 463/25 |
| 2009/0170592 | A1 * | 7/2009 | Cuddy | 463/20 |

* cited by examiner

*Primary Examiner* — Michael Cuff
(74) *Attorney, Agent, or Firm* — Lexyoume IP Meister, PLLC.

(57) ABSTRACT

N symbol arrays are scrolled in M rows and N columns of display regions. In each of the symbol arrays, a normal symbol same as a certain normal symbol does not exist within (M−1) rows above and below the certain normal symbol. Therefore, two or more of the same normal symbols are not displayed in each column of display regions, and a maximum of N of the same normal symbols are displayed in all the display regions. Further, the same normal symbols as those present within (M−1) rows above and below the special symbol included in one symbol array do not exist within (M−1) rows above and below the special symbols included in the other symbol arrays. Therefore, when N of the same normal symbols are displayed, a maximum of one special symbol is displayed.

14 Claims, 31 Drawing Sheets

| | First video reel | Second video reel | Third video reel | Fourth video reel | Fifth video reel |
|---|---|---|---|---|---|
| Code number | Symbol | Symbol | Symbol | Symbol | Symbol |
| 00 | SUN | SUN | SUN | SUN | SUN |
| 01 | ORANGE | PLUM | ORANGE | APPLE | APPLE |
| 02 | PLUM | ORANGE | BELL | STRAWBERRY | BELL |
| 03 | STRAWBERRY | FEATURE | STRAWBERRY | ORANGE | MELON |
| 04 | CHERRY | STRAWBERRY | ORANGE | FEATURE | CHERRY |
| 05 | MELON | PLUM | SUN | MELON | STRAWBERRY |
| 06 | APPLE | SUN | PLUM | STRAWBERRY | ORANGE |
| 07 | BELL | BELL | ORANGE | APPLE | FEATURE |
| 08 | FEATURE | WILD | WILD | WILD | SUN |
| 09 | SUN | CHERRY | MELON | STRAWBERRY | APPLE |
| 10 | ORANGE | SUN | PLUM | APPLE | BELL |
| 11 | PLUM | STRAWBERRY | ORANGE | PLUM | MELON |
| 12 | STRAWBERRY | MELON | APPLE | SUN | JP7 |
| 13 | CHERRY | ORANGE | JP7 | MELON | STRAWBERRY |
| 14 | JP7 | SUN | PLUM | ORANGE | PLUM |
| 15 | SUN | JP7 | SUN | STRAWBERRY | ORANGE |
| 16 | ORANGE | APPLE | ORANGE | PLUM | SUN |
| 17 | PLUM | SUN | STRAWBERRY | SUN | APPLE |
| 18 | STRAWBERRY | STRAWBERRY | FEATURE | CHERRY | BELL |
| 19 | CHERRY | MELON | MELON | BELL | MELON |
| 20 | MELON | APPLE | CHERRY | STRAWBERRY | CHERRY |
| 21 | APPLE | CHERRY | BELL | JP7 | PLUM |

| | First video reel | Second video reel | Third video reel | Fourth video reel | Fifth video reel |
|---|---|---|---|---|---|
| Code number | Symbol | Symbol | Symbol | Symbol | Symbol |
| 00 | SUN | SUN | SUN | SUN | SUN |
| 01 | ORANGE | PLUM | ORANGE | APPLE | APPLE |
| 02 | PLUM | ORANGE | BELL | STRAWBERRY | BELL |
| 03 | STRAWBERRY | FEATURE | STRAWBERRY | ORANGE | MELON |
| 04 | CHERRY | STRAWBERRY | ORANGE | FEATURE | CHERRY |
| 05 | MELON | PLUM | SUN | MELON | STRAWBERRY |
| 06 | APPLE | SUN | PLUM | STRAWBERRY | ORANGE |
| 07 | BELL | BELL | ORANGE | APPLE | FEATURE |
| 08 | FEATURE | APPLE | BELL | CHERRY | SUN |
| 09 | SUN | CHERRY | MELON | STRAWBERRY | APPLE |
| 10 | ORANGE | SUN | PLUM | APPLE | BELL |
| 11 | PLUM | STRAWBERRY | ORANGE | PLUM | MELON |
| 12 | STRAWBERRY | MELON | APPLE | SUN | JP7 |
| 13 | CHERRY | ORANGE | JP7 | MELON | STRAWBERRY |
| 14 | JP7 | SUN | PLUM | ORANGE | PLUM |
| 15 | SUN | JP7 | SUN | STRAWBERRY | ORANGE |
| 16 | ORANGE | APPLE | ORANGE | PLUM | SUN |
| 17 | PLUM | SUN | STRAWBERRY | SUN | APPLE |
| 18 | STRAWBERRY | STRAWBERRY | FEATURE | CHERRY | BELL |
| 19 | CHERRY | MELON | MELON | BELL | MELON |
| 20 | MELON | APPLE | CHERRY | STRAWBERRY | CHERRY |
| 21 | APPLE | CHERRY | BELL | JP7 | PLUM |

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | SUN | SUN | SUN | SUN | SUN |
| 01 | ORANGE | PLUM | ORANGE | APPLE | APPLE |
| 02 | PLUM | ORANGE | BELL | STRAWBERRY | BELL |
| 03 | STRAWBERRY | FEATURE | STRAWBERRY | ORANGE | MELON |
| 04 | CHERRY | STRAWBERRY | ORANGE | FEATURE | CHERRY |
| 05 | MELON | PLUM | SUN | MELON | STRAWBERRY |
| 06 | APPLE | SUN | PLUM | STRAWBERRY | ORANGE |
| 07 | BELL | BELL | ORANGE | APPLE | FEATURE |
| 08 | FEATURE | WILD | WILD | WILD | SUN |
| 09 | SUN | CHERRY | MELON | STRAWBERRY | APPLE |
| 10 | ORANGE | SUN | PLUM | APPLE | BELL |
| 11 | PLUM | STRAWBERRY | ORANGE | PLUM | MELON |
| 12 | STRAWBERRY | MELON | APPLE | SUN | JP7 |
| 13 | CHERRY | ORANGE | JP7 | MELON | STRAWBERRY |
| 14 | JP7 | SUN | PLUM | ORANGE | PLUM |
| 15 | SUN | JP7 | SUN | STRAWBERRY | ORANGE |
| 16 | ORANGE | APPLE | ORANGE | PLUM | SUN |
| 17 | PLUM | SUN | STRAWBERRY | SUN | APPLE |
| 18 | STRAWBERRY | STRAWBERRY | FEATURE | CHERRY | BELL |
| 19 | CHERRY | MELON | MELON | BELL | MELON |
| 20 | MELON | APPLE | CHERRY | STRAWBERRY | CHERRY |
| 21 | APPLE | CHERRY | BELL | JP7 | PLUM |

FIG. 6

| | First video reel | Second video reel | Third video reel | Fourth video reel | Fifth video reel |
|---|---|---|---|---|---|
| Code number | Symbol | Symbol | Symbol | Symbol | Symbol |
| 00 | SUN | SUN | SUN | SUN | SUN |
| 01 | ORANGE | PLUM | ORANGE | APPLE | APPLE |
| 02 | PLUM | ORANGE | BELL | STRAWBERRY | BELL |
| 03 | STRAWBERRY | FEATURE | STRAWBERRY | ORANGE | MELON |
| 04 | CHERRY | STRAWBERRY | ORANGE | FEATURE | CHERRY |
| 05 | MELON | PLUM | SUN | MELON | STRAWBERRY |
| 06 | APPLE | SUN | PLUM | STRAWBERRY | ORANGE |
| 07 | BELL | BELL | ORANGE | APPLE | FEATURE |
| 08 | FEATURE | APPLE | BELL | CHERRY | SUN |
| 09 | SUN | CHERRY | MELON | STRAWBERRY | APPLE |
| 10 | ORANGE | SUN | PLUM | APPLE | BELL |
| 11 | PLUM | STRAWBERRY | ORANGE | PLUM | MELON |
| 12 | STRAWBERRY | MELON | APPLE | SUN | JP7 |
| 13 | CHERRY | ORANGE | JP7 | MELON | STRAWBERRY |
| 14 | JP7 | SUN | PLUM | ORANGE | PLUM |
| 15 | SUN | JP7 | SUN | STRAWBERRY | ORANGE |
| 16 | ORANGE | APPLE | ORANGE | PLUM | SUN |
| 17 | PLUM | SUN | STRAWBERRY | SUN | APPLE |
| 18 | STRAWBERRY | STRAWBERRY | FEATURE | CHERRY | BELL |
| 19 | CHERRY | MELON | MELON | BELL | MELON |
| 20 | MELON | APPLE | CHERRY | STRAWBERRY | CHERRY |
| 21 | APPLE | CHERRY | BELL | JP7 | PLUM |

FIG. 7

| | First video reel | Second video reel | Third video reel | Fourth video reel | Fifth video reel |
|---|---|---|---|---|---|
| Code number | Symbol | Symbol | Symbol | Symbol | Symbol |
| 00 | SUN | SUN | PLUM | STRAWBERRY | SUN |
| 01 | STRAWBERRY | BELL | ORANGE | APPLE | STRAWBERRY |
| 02 | BELL | WILD | WILD | WILD | PLUM |
| 03 | ORANGE | CHERRY | MELON | STRAWBERRY | ORANGE |
| 04 | SUN | SUN | PLUM | APPLE | STRAWBERRY |
| 05 | PLUM | PLUM | SUN | SUN | CHERRY |
| 06 | APPLE | STRAWBERRY | STRAWBERRY | PLUM | BELL |

FIG. 9

Payout table

| | 3KIND | 4KIND | 5KIND | 6KIND |
|---|---|---|---|---|
| JP | — | — | JP bonus | — |
| FEATURE | — | — | Free game trigger | — |
| SUN | 50 | 100 | 800 | 2000 |
| STRAWBERRY | 30 | 60 | 500 | 1200 |
| PLUM | 20 | 40 | 300 | 800 |
| BELL | 10 | 20 | 150 | 400 |
| APPLE | 5 | 10 | 80 | 200 |
| MELON | — | 8 | 60 | 120 |
| CHERRY | — | 5 | 40 | 100 |
| ORANGE | — | 3 | 20 | 50 |

FIG. 10

Payout table

| | 3KIND (Without wild) | 3KIND (With wild) | 4KIND (Without wild) | 4KIND (With wild) | 5KIND (Without wild) | 5KIND (With wild) | 6KIND |
|---|---|---|---|---|---|---|---|
| SUN | 20 | 20 × K | 40 | 40 × K | 100 | 100 × K | 300 × K |
| STRAWBERRY | 15 | 15 × K | 30 | 30 × K | 80 | 80 × K | 200 × K |
| PLUM | 10 | 10 × K | 20 | 20 × K | 50 | 50 × K | 150 × K |

FIG. 36

| Number of games be added / Selected number of games | One game | Two games | Three games | Five games | Average number of games added |
|---|---|---|---|---|---|
| 20FG | 5% | 14% | 31% | 50% | 3.8 games |
| 15FG | 20% | 25% | 25% | 30% | 3.0 games |
| 10FG | 45% | 25% | 20% | 10% | 2.1 games |
| 8FG | 56% | 27% | 14% | 3% | 1.7 games |
| 5FG | 97% | 1% | 1% | 1% | 1.1 games |

FIG. 38

| | First video reel | Second video reel | Third video reel | Fourth video reel | Fifth video reel |
|---|---|---|---|---|---|
| Code number | Symbol | Symbol | Symbol | Symbol | Symbol |
| 00 | SUN | SUN | SUN | SUN | SUN |
| 01 | ORANGE | PLUM | ORANGE | APPLE | APPLE |
| 02 | PLUM | ORANGE | BELL | STRAWBERRY | BELL |
| 03 | STRAWBERRY | FEATURE | STRAWBERRY | ORANGE | MELON |
| 04 | CHERRY | STRAWBERRY | FEATURE | FEATURE | CHERRY |
| 05 | MELON | PLUM | SUN | MELON | STRAWBERRY |
| 06 | APPLE | SUN | PLUM | STRAWBERRY | ORANGE |
| 07 | BELL | BELL | ORANGE | APPLE | FEATURE |
| 08 | FEATURE | APPLE | BELL | CHERRY | SUN |
| 09 | SUN | CHERRY | MELON | STRAWBERRY | APPLE |
| 10 | ORANGE | SUN | PLUM | APPLE | BELL |
| 11 | PLUM | STRAWBERRY | ORANGE | PLUM | MELON |
| 12 | STRAWBERRY | MELON | APPLE | SUN | JP7 |
| 13 | CHERRY | ORANGE | JP7 | MELON | STRAWBERRY |
| 14 | JP7 | SUN | PLUM | ORANGE | PLUM |
| 15 | SUN | JP7 | SUN | STRAWBERRY | ORANGE |
| 16 | FEATURE | APPLE | ORANGE | PLUM | SUN |
| 17 | PLUM | SUN | STRAWBERRY | SUN | FEATURE |
| 18 | STRAWBERRY | FEATURE | FEATURE | FEATURE | BELL |
| 19 | CHERRY | MELON | MELON | BELL | MELON |
| 20 | MELON | APPLE | CHERRY | STRAWBERRY | CHERRY |
| 21 | APPLE | CHERRY | BELL | JP7 | PLUM |

GAMING MACHINE AND METHOD FOR CONTROLLING THE SAME

CROSS REFERENCE TO RELATED APPLICATIONS

This application is based upon and claims the benefit of priority from the prior Japanese Patent Application No. 2009-132497, filed on Jun. 1, 2009, the entire contents of which are incorporated herein by reference.

BACKGROUND OF THE INVENTION

1. Field of the Invention

The present invention relates to a gaming machine and a method for controlling the same.

2. Description of the Related Art

Slot machines disclosed in the specifications of U.S. Pat. Nos. 6,960,133 and 6,012,983 have been known as related gaming machines. When a player inserts game media such as medals, coins and bills into an insertion slot of such a slot machine and presses a spin button, the slot machine displays multiple scrolling symbols in a display unit provided on a front surface of a case body, and then automatically stops the symbols. Subsequently, based on a combination of the stopped symbols, the slot machine determines whether or not to make a transition to a feature game, and also determines whether or not a winning combination is established.

SUMMARY OF THE INVENTION

However, the related gaming machines described above determine a winning combination based on the number of the same symbols displayed in display regions. For example, in the case where a display is provided with a total of fifteen display regions arranged in three rows and five columns and where the maximum number of the same symbols displayed in one column is set to one, the maximum number of the same symbols displayed in the display regions is five. In this case, the maximum winning combination is 5KIND. For this reason, winning combinations equal to or larger than 6KIND are not established, and thereby the expectations of the player are reduced. On the other hand, when the number of the same symbols displayed in the display regions is too many, there arises a drawback that a payout for a winning combination becomes excessive.

An object of the present invention is to provide a gaming machine with new entertainment properties, and a method for controlling the same.

A first aspect of the present invention is a gaming machine comprising: an input device configured to receive a bet for each of unit games; a display having M rows and N columns of display regions; a memory configured to store data on N symbol arrays; and a controller, wherein each of the N symbol arrays has S rows of symbol regions, each of the symbol regions includes any one of multiple types of normal symbols and a special symbol other than the normal symbols, and the N symbol arrays meet following conditions (A) to (D): (A) S is larger than M, (B) when the symbol regions on an upper end and a lower end of each symbol array are connected in a loop, for each symbol array, the symbol regions within (M−1) rows above and below a symbol region including a certain normal symbol in the symbol array do not include a same type of normal symbol as the certain normal symbol, (C) each of at least two of the symbol arrays include the special symbol, and (D) when the symbol regions on the upper and lower ends of each symbol array are connected in a loop, same types of normal symbols as normal symbols included in the symbol regions within (M−1) rows above and below the symbol region including the special symbol of one of the symbol arrays are not included in the symbol regions within (M−1) rows above and below the symbol region including the special symbol of the other symbol array, and the controller is configured to (a) execute a unit game in which the symbol arrays are displayed in the display regions while being scrolled in a loop pattern and then stopped and displayed so that symbols are displayed in all the respective display regions, and (b) generate a payout based on a combination of same type of normal symbols and special symbols stopped and displayed in the respective display regions.

According to the first aspect of the present invention, a unit game is executed based on an input to the input device and an outcome of the unit game is displayed on the display. In the N columns of display regions provided on the display, the normal symbols or the special symbols provided in the N symbol arrays stored in the memory are displayed, respectively. In each of the symbol arrays, a normal symbol same as a certain normal symbol does not exist within (M−1) rows above and below the certain normal symbol. Thus, two or more of the same normal symbols are not displayed in the same column of display regions. Therefore, a maximum of N of the same normal symbols are displayed in the display regions. Further, the same normal symbols as those present within (M−1) rows above and below the special symbol present in one of the symbol arrays do not exist within (M−1) rows above and below the special symbols present in the other symbol arrays. Therefore, the maximum number of the same symbols displayed in the display regions is N, and a maximum of one special symbol can be stopped in this case. For this reason, the maximum winning combination to be established is (N+1) KIND. Thus, a gaming machine with new entertainment properties can be provided.

The controller may be configured to generate a payout based on a number of the special symbols stopped and displayed in the display regions, and a number of same type of normal symbols stopped and displayed consecutively from any one of a far left column and a far right column of the N columns of display regions toward the other.

The special symbol may not be included in the symbol arrays displayed in far left and far right display regions in the N symbol arrays.

The controller may be configured to provide the payout generated in the (b).

A second aspect of the present invention is a gaming machine comprising: an input device configured to receive abet for each of unit games; a display having three rows and five columns of display regions; a memory configured to store data on five symbol arrays; and a controller, wherein each of the five symbol arrays has S rows of symbol regions, each of the symbol regions includes any one of multiple types of normal symbols and a special symbol other than the normal symbols, and the five symbol arrays meet following conditions (A) to (D): (A) S is larger than 3, (B) when the symbol regions on an upper end and a lower end of each symbol array are connected in a loop, for each symbol array, the symbol regions within two rows above and below a symbol region including a certain normal symbol in the symbol array do not include a same type of normal symbol as the certain normal symbol, (C) each of at least two of the symbol arrays include the special symbol, and (D) when the symbol regions on the upper and lower ends of each symbol array are connected in a loop, same types of normal symbols as normal symbols included in the symbol regions within two rows above and below the symbol region including the special symbol of one of the symbol arrays are not included in the symbol regions within two rows above and below the symbol region including the special symbol of the other symbol array, and the controller is configured to (a) execute a unit game in which the symbol arrays are displayed in the display regions while being scrolled in a loop pattern and then stopped and displayed so that symbols are displayed in all the respective display regions, and (b) generate a payout based on a combination of same type of normal symbols and special symbols stopped and displayed in the respective display regions.

According to the second aspect of the present invention, a unit game is executed based on an input to the input device and an outcome of the unit game is displayed on the display. In the five columns of display regions provided on the display, the normal symbols or the special symbols provided in the five symbol arrays stored in the memory are displayed, respectively. In each of the symbol arrays, a normal symbol same as a certain normal symbol does not exist within (M−1) rows above and below the certain normal symbol. Thus, two or more of the same normal symbols are not displayed in the same column of display regions. Therefore, a maximum of five of the same normal symbols are displayed. Further, the same normal symbols as those present within two rows above and below the special symbol present in one of the symbol arrays do not exist within two rows above and below the special symbols present in the other symbol arrays. Therefore, the maximum number of the same symbols displayed in the display regions is five, and a maximum of one special symbol can be stopped in this case. For this reason, the maximum winning combination to be established is 6KIND. Thus, a gaming machine with new entertainment properties can be provided.

The controller may be configured to generate a payout based on a number of the special symbols stopped and displayed in the display regions, and a number of same type of normal symbols stopped and displayed consecutively from any one of a far left column and a far right column of the N columns of display regions toward the other.

The special symbol may not be included in the symbol arrays displayed in far left and far right display regions in the five symbol arrays.

A third aspect of the present invention is a method for controlling a gaming machine, the method comprising: by a controller, displaying N symbol arrays being scrolled in a loop pattern in M rows and N columns of display regions; after displaying the symbol arrays being scrolled, stopping and displaying the symbol arrays so that symbols are displayed in all the respective display regions; and generating a payout based on a combination of normal symbols and special symbols other than the normal symbols stopped and displayed in the respective display regions, wherein each of the N symbol arrays has S rows of symbol regions, and the N symbol arrays meet following conditions (A) to (D): (A) S is larger than M, (B) when the symbol regions on an upper end and a lower end of each symbol array are connected in a loop, for each symbol array, the symbol regions within (M−1) rows above and below a symbol region including a certain normal symbol in the symbol array do not include a same type of normal symbol as the certain normal symbol, (C) each of at least two of the symbol arrays include the special symbol, and (D) when the symbol regions on the upper and lower ends of each symbol array are connected in a loop, same types of normal symbols as normal symbols included in the symbol regions within (M−1) rows above and below the symbol region including the special symbol of one of the symbol arrays are not included in the symbol regions within (M−1) rows above and below the symbol region including the special symbol of the other symbol array.

In the step of generating a payout, the payout may be generated based on a number of the special symbols stopped and displayed in the display regions, and a number of same type of normal symbols stopped and displayed consecutively from any one of a far left column and a far right column of the N columns of display regions toward the other.

The special symbol may not be included in the symbol arrays displayed in far left and far right display regions in the N symbol arrays.

A fourth aspect of the present invention is a method for controlling a gaming machine, the method comprising: by a controller, displaying five symbol arrays being scrolled in a loop pattern in three rows and five columns of display regions; after displaying the symbol arrays being scrolled, stopping and displaying the symbol arrays so that symbols are displayed in all the respective display regions; and generating a payout based on a combination of normal symbols and special symbols other than the normal symbols stopped and displayed in the respective display regions, wherein each of the five symbol arrays has S rows of symbol regions, and the five symbol arrays meet following conditions (A) to (D): (A) S is larger than 3, (B) when the symbol regions on an upper end and a lower end of each symbol array are connected in a loop, for each symbol array, the symbol regions within (M−1) rows above and below a symbol region including a certain normal symbol in the symbol array do not include a same type of normal symbol as the certain normal symbol, (C) each of at least two of the symbol arrays include the special symbol, and (D) when the symbol regions on the upper and lower ends of each symbol array are connected in a loop, same types of normal symbols as normal symbols included in the symbol regions within two rows above and below the symbol region including the special symbol of one of the symbol arrays are not included in the symbol regions within two rows above and below the symbol region including the special symbol of the other symbol array.

In the step of generating a payout, the payout may be generated based on a number of the special symbols stopped and displayed in the display regions, and a number of same type of normal symbols stopped and displayed consecutively from any one of a far left column and a far right column of the N columns of display regions toward the other.

The special symbol may not be included in the symbol arrays displayed in far left and far right display regions in the five symbol arrays.

BRIEF DESCRIPTION OF THE DRAWINGS

FIG. 5 is a view illustrating arrangement of symbols drawn on peripheral surfaces of respective reels of the gaming machine according to the embodiment.

FIG. 6 is a view illustrating arrangement of symbols drawn on peripheral surfaces of respective reels of the gaming machine according to the embodiment.

FIG. 7 is a view illustrating arrangement of symbols drawn on peripheral surfaces of respective reels of the gaming machine according to the embodiment.

FIG. 9 is a view illustrating a symbol combination table of the gaming machine according to the embodiment of the present invention.

FIG. 10 is a view illustrating a symbol combination table of the gaming machine according to the embodiment of the present invention.

FIG. 36 is a view illustrating a lottery table for determining a number of free games to be added, used in the gaming machine according to the sixth embodiment of the present invention.

FIG. 38 is a view illustrating arrangement of symbols drawn on peripheral surfaces of respective reels of the gaming machine according to the embodiment.

DETAILED DESCRIPTION OF THE EMBODIMENTS

With reference to the drawings, embodiments of the present invention will be described below. A gaming machine according to embodiments of the present invention includes: (a) BET switches (a 1-BET switch 34S and a maximum BET switch 35S) configured to receive abet for each unit game; (b) a lower image display panel 141 having M rows and N columns of display regions and configured to display an outcome of the unit game; and (c) a RAM 73 (memory) configured to store N symbol arrays. Each of the N symbol arrays has S rows of symbol regions, and each of the symbol regions include one of multiple types of normal symbols or a special symbol.

In each of the N symbol arrays stored in the RAM 73, assuming that the symbol regions on the upper and lower ends of the same symbol array are connected to each other, a normal symbol same as a certain normal symbol does not exist within (M−1) rows above and below the certain normal symbol. Further, in more than one of the symbol arrays, WILD symbols (special symbols) are provided, which can be replaced with any one of multiple types of symbols. Further, the same normal symbols as that present within (M−1) rows above and below the WILD symbol present in one of the symbol arrays do not exist within (M−1) rows above and below the WILD symbols present in the other symbol arrays.

When a unit game is executed by a controller, the symbols are stopped in a symbol display region 4, and whether or not a winning combination is established is determined based on a combination of the stopped symbols. In this event, a maximum of N of the same normal symbols are displayed, and a maximum of one WILD symbol is displayed. Thus, the maximum winning combination to be established is (N+1)KIND.

Figure 1:
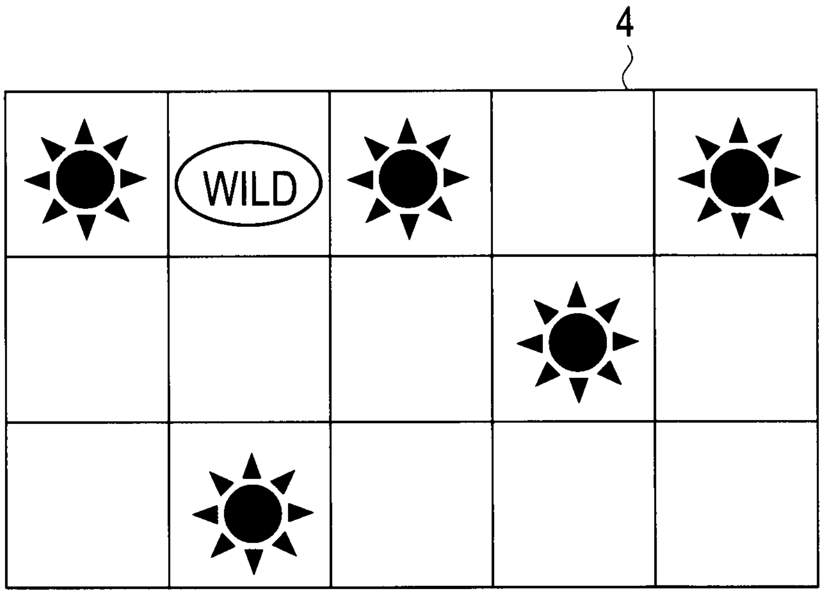
FIG. 1 is an explanatory view illustrating a symbol display region in which 5KIND and a WILD symbol are displayed, of a gaming machine according to an embodiment of the present invention.

Therefore, when the lower image display panel 141 includes, for example, three rows and five columns of display regions, a maximum of five of the same symbols (SUN) are displayed and a maximum of one WILD symbol is also displayed, as shown in FIG. 1. Thus, a winning combination of 6KIND is established.

[First Embodiment]

[Explanation of Function Flow Diagram]

Figure 2:
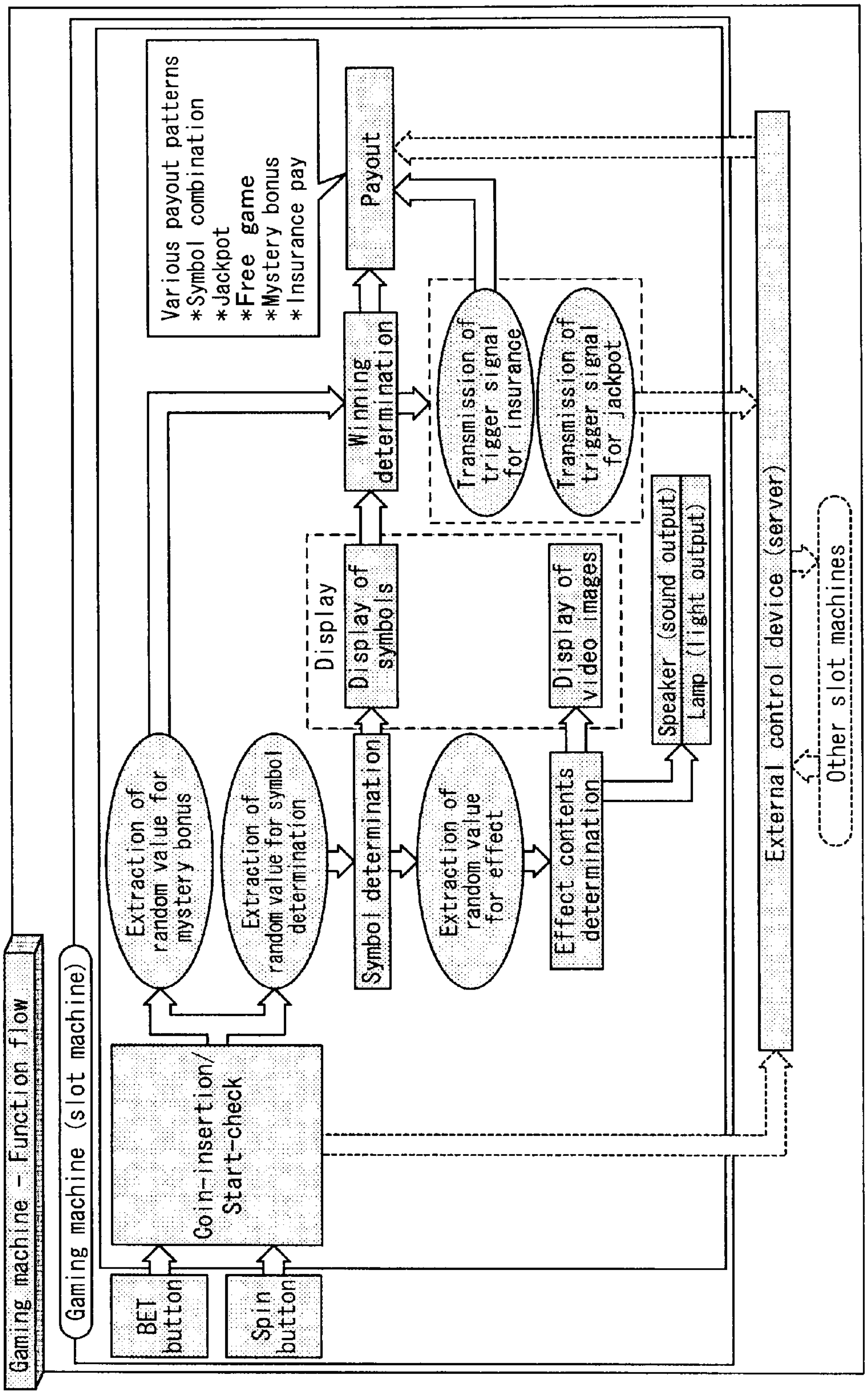
FIG. 2 is a view illustrating a function flow of a gaming machine according to an embodiment of the present invention.

With reference to FIG. 2, basic functions of a gaming machine according to the present embodiment are described. FIG. 2 is a view illustrating a function flow of the gaming machine according to an embodiment of the present invention.

<Coin-Insertion/Start-Check>

First, the gaming machine checks whether or not a BET button has been pressed by a player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a free game trigger has been displayed, the gaming machine starts a free game. It is to be noted that, in the present embodiment, a game in which a lottery relating to the aforementioned determination of to-be stopped symbols is held a predetermined number of times without using coins is played as a free game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus trigger by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

The basic functions of the gaming machine have been described above. Next, with reference to FIG. 3, a game system including the gaming machine is described.

Figure 3:
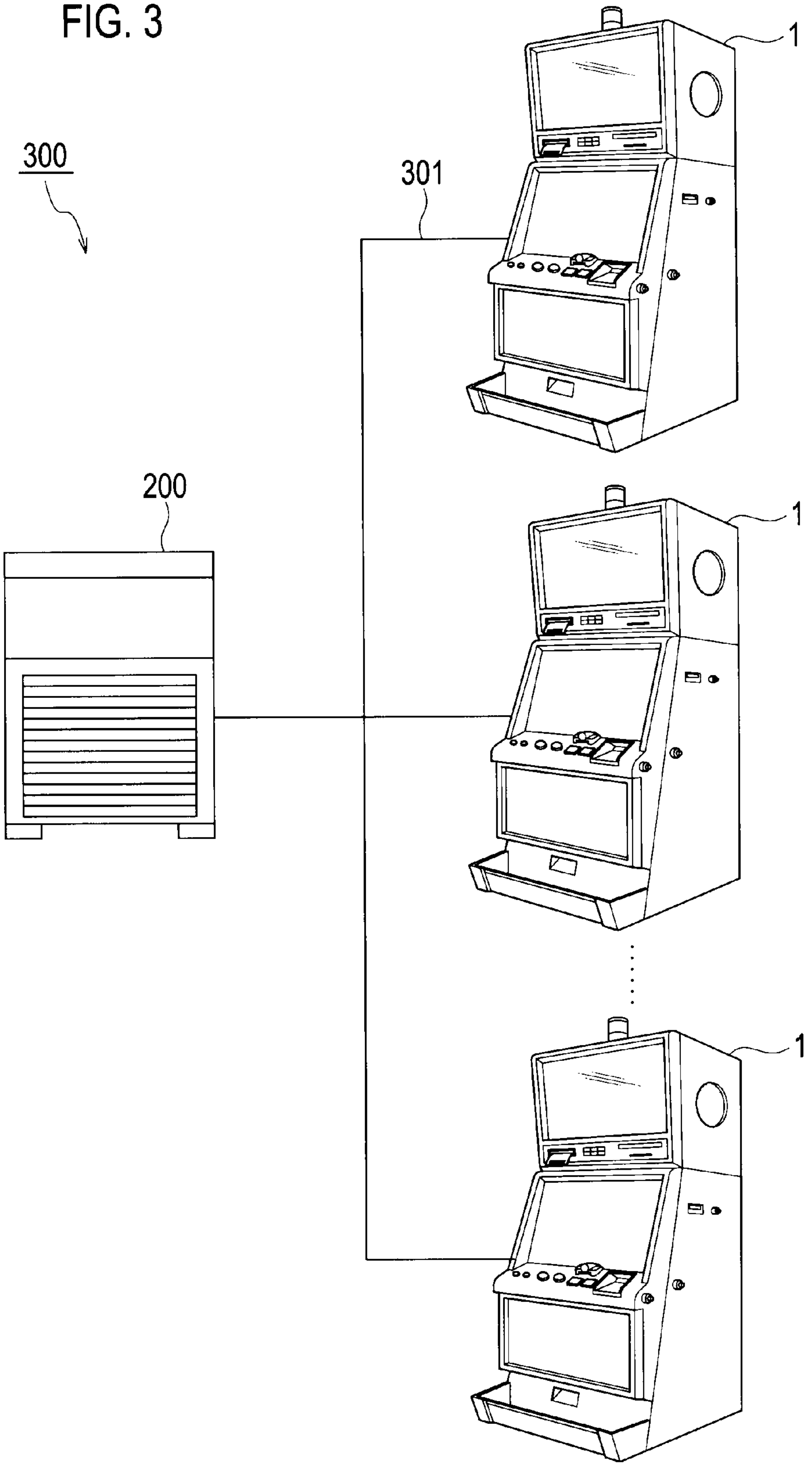
FIG. 3 is a view illustrating a game system including the gaming machine according to the embodiment of the present invention.

FIG. 3 is a view illustrating the game system including the gaming machine according to the embodiment of the present invention.

A game system 300 includes a plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

The game system according to the present embodiment has been described above. Next, with reference to FIG. 4, an overall configuration of the gaming machine 1 is described.

Figure 4:
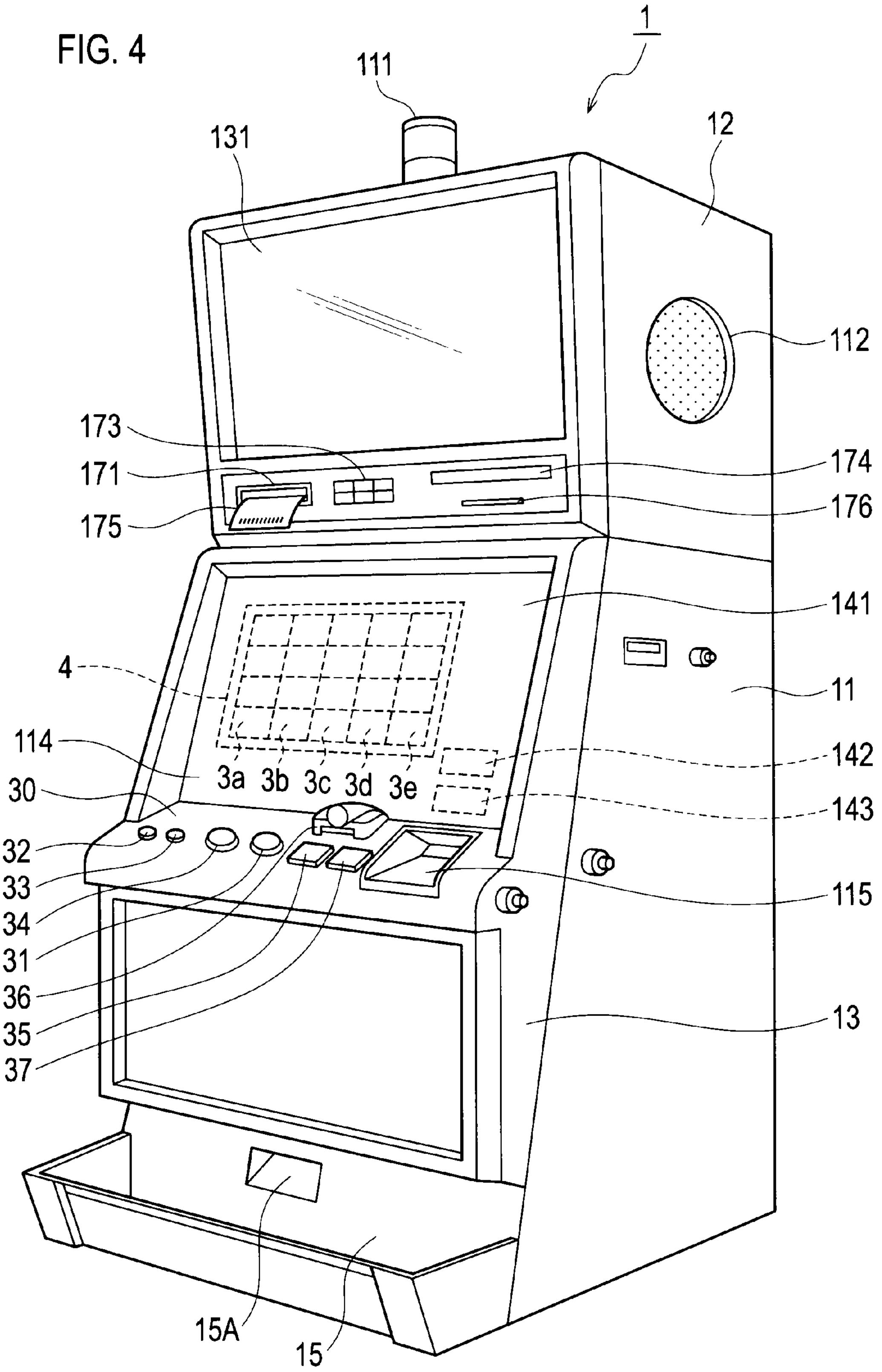
FIG. 4 is a view illustrating the overall configuration of the gaming machine according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

The lower image display panel 141 is provided at the center of the main door 13. The lower image display panel 141 includes a liquid crystal panel and has the symbol display region 4. In the symbol display region 4, a total of fifteen display regions are provided in three rows and five columns.

Figure 21:
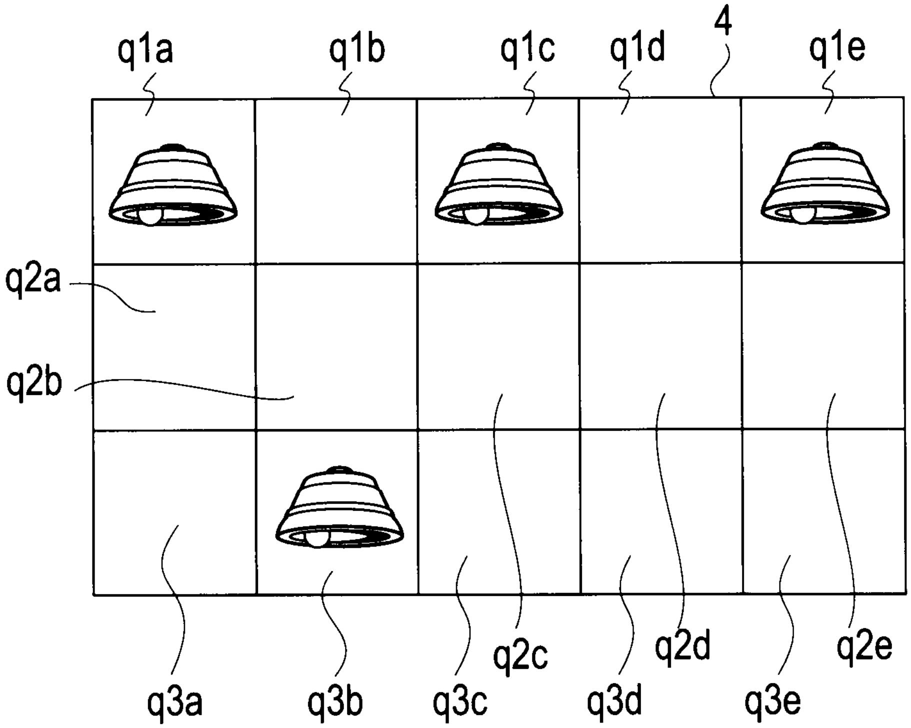
FIG. 21 is a view illustrating 3KIND of "BELL" symbols displayed of the gaming machine according to the embodiment of the present invention.

The display regions are denoted respectively by reference numerals q1a to q3e (see FIG. 21). For example, the display region in the second row, third column is "q2c". Symbols of five video reels 3 (3a, 3b, 3c, 3d, 3e) are displayed in the respective columns (a total of five columns) of the symbol display region 4.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 or 7 in the present embodiment) of symbols is assigned (see FIGS. 5 to 7 which are described later).

In the symbol display region 4, the symbol arrays assigned to the respective video reels 3 are separately scrolled, and are stopped after predetermined time has elapsed. As a result, a part (three consecutive symbols in the present embodiment) of each of the symbol arrays is displayed for the player.

The symbol display region 4 has three regions, namely an upper region, a central region, and a lower region, for each video reel 3, and a single symbol is to be displayed to each region. That is, symbols are to be displayed in the total of fifteen display regions q1a to q3e provided in three rows and five columns in the symbol display region 4.

Figure 22:
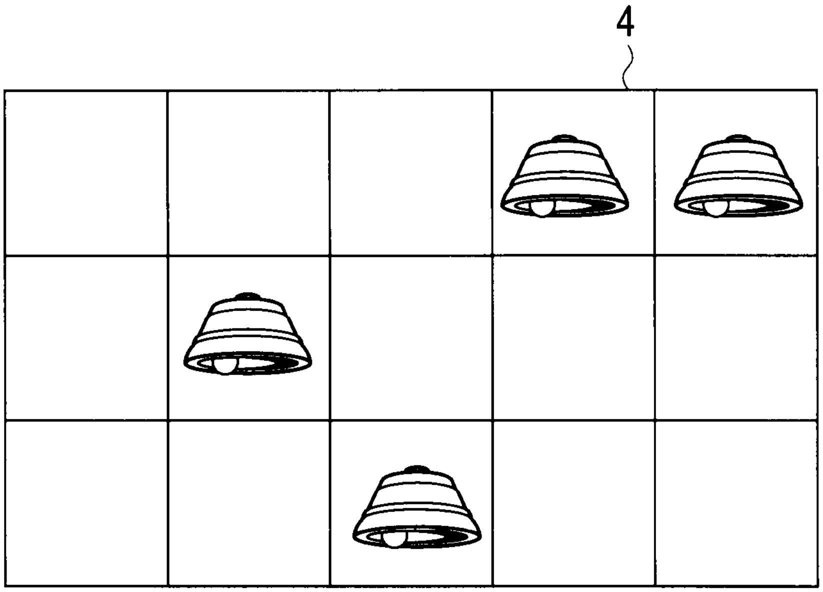
FIG. 22 is a view illustrating an example display of lost of the gaming machine according to the embodiment of the present invention.

In the present embodiment, the gaming machine is set to provide a payout according to the number of the same symbols displayed consecutively from the far left column (the column of q1a, q2a and q3a) to the other columns in the right. For example, as shown in FIG. 21, when three "BELL" symbols are displayed consecutively from the far left column, a winning combination is established and a payout is set to 10 as shown in a payout table of FIG. 9. On the other hand, as shown in FIG. 22, even if a total of four "BELL" symbols are displayed, the game is lost when the symbols are not displayed consecutively from the far left column.

It is to be noted that, contrary to the aforementioned example where the payout is generated according to the number of the same symbols displayed consecutively from the far left column to the other columns in the right, the payout may be generated according to the number of the same symbols displayed consecutively from the far right column to the other columns in the left. Moreover, the payout may be generated according to the number of the same symbols displayed in the fifteen display regions.

Further, in the present embodiment, the description is given of the example where the total of fifteen display regions q1a to q3e are provided in three rows and five columns in the symbol display region 4. However, the present invention is not limited thereto, but may be applied to an example where the display regions are provided in M rows and N columns.

Further, the lower image display panel 141 has a number-of-credits display region 142 and an amount-of-payout display region 143. The number-of-credits display region 142 displays the number of coins (hereinafter also referred to as "the number of credits") owned by the player and retained inside the gaming machine 1. The amount-of-payout display region 143 displays the number of coins (hereinafter also referred to as "the amount of a payout") to be paid out to the player when winning is established.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the amount of a BET") to be used in the game from the coins retained inside the gaming machine 1. The 1-BET button is used when determining one coin at a time for the aforementioned amount of a BET. The maximum BET button 35 is used when setting the aforementioned amount of a BET to a defined upper limit number. An insurance setting button 37 is used for setting insurance.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIGS. 5 to 7, a configuration of the symbol arrays included in the video reels 3 of the gaming machine 1 is described.

FIG. 5 is a view illustrating arrangement of symbols drawn on peripheral surfaces of respective reels (hereinafter referred to as a first reel pattern) in the gaming machine according to the first embodiment and a gaming machine according to a third embodiment. FIG. 6 is a view illustrating arrangement of symbols drawn on peripheral surfaces of respective reels (hereinafter referred to as a second reel pattern) in the gaming machine according to the third embodiment and a gaming machine according to a second embodiment. FIG. 7 is a view illustrating arrangements of symbol drawn on the peripheral surfaces of the respective reels (hereinafter referred to as a third reel pattern) in the gaming machine according to the second embodiment.

In FIGS. 5 and 6, A first video reel 3*a*, a second video reel 3*b*, a third video reel 3*c*, a fourth video reel 3*d*, and a fifth video reel 3*e* each is assigned with a symbol array consisting of 22 symbols that correspond to respective code numbers from "00" to "21". The upper and lower ends of each symbol array are connected in a loop.

In the arrangement of symbols of the first reel pattern shown in FIG. 5, "JP7", "FEATURE", "SUN", "BELL", "CHERRY", "STRAWBERRY", "PLUM", "ORANGE", "APPLE", "MELON", "ORANGE" and "WILD" are provided as types of symbols. These symbols other than "WILD" are normal symbols. "WILD" is a symbol (special symbol) which can be replaced with various types of symbols other than "FEATURE" and "JP7". Further, "WILD" is provided in each of the second to fourth video reels 3*b* to 3*d*, and is not provided in the first and fifth video reels 3*a* and 3*e*. In other words, "WILD" is not provided in the far left and far right video reels.

In each of the symbol arrays assigned to the respective video reels 3, the symbols are assigned in a manner that a symbol same as a certain symbol does not exist within two rows above and below the certain symbol. For example, in the first video reel 3*a* shown in FIG. 5, the symbol array is set so that "PLUM" does not exist within two rows above and below "PLUM" of the code number "02", i.e. does not exist in the code numbers "00", "01", "03" and "04". Therefore, two or more of the same symbols are not displayed in the same column of display regions (e.g. the column including q1*a*, q2*a* and q3*a*). For this reason, the maximum number of the same symbols displayed in the symbol display region 4 is five.

Further, each of the symbol arrays assigned to the respective video reels 3 is set so that symbols same as those present within two rows above and below "WILD" in one video reel do not exist within two rows above and below "WILD" in the other video reels. For example, "SUN", "BELL", "CHERRY" and "SUN" are arranged within two rows above and below "WILD" arranged in the code number "08" of the second video reel 3*b*, i.e. arranged in the code numbers "06", "07", "09" and "10". The same symbols as those mentioned above do not exist within two rows above and below "WILD" in the third and fourth video reels 3*c* and 3*d*. Specifically, "SUN", "BELL" and "CHERRY" described above do not exist in the code numbers "06", "07", "09" and "10" of the third and fourth video reels 3*c* and 3*d*.

By setting the symbol arrays of the respective video reels 3 as described above, the maximum number of the same symbols displayed in the symbol display region 4 is five, and a maximum of one "WILD" is further displayed. Therefore, the maximum winning combination to be established for any symbol is 6KIND.

Further, in the present embodiment, the description is given of the example where the symbol display region 4 includes three rows and five columns of display regions. Meanwhile, in the case where the symbol display region 4 includes M rows and N columns of display regions, in each of the symbol arrays assigned to the respective video reels 3, a symbol same as a certain symbol does not exist within (M−1) rows above and below the certain symbol. Further, each of the symbol arrays assigned to the respective video reels 3 may be set so that symbols same as those present within (M−1) rows above and below "WILD" in one video reel do not exist within (M−1) rows above and below "WILD" in the other video reels.

Such setting of the symbol arrays allows establishment of a symbol combination of up to (N+1)KIND.

FIGS. 6 and 7 are views illustrating symbol arrays drawn on the peripheral surfaces of the respective reels in the gaming machine according to the second embodiment of the present invention. FIG. 6 shows the symbol arrays used in the normal unit game, and FIG. 7 shows the symbol arrays used in the free game.

In the symbol arrays of the second reel pattern shown in FIG. 6, "JP7", "FEATURE", "SUN", "BELL", "CHERRY", "STRAWBERRY", "PLUM", "ORANGE", "APPLE", and "MELON" are provided as types of symbols. In other words, the second reel pattern is different from the aforementioned FIG. 5 in including no "WILD".

Further, as in the case of the aforementioned FIG. 5, in each of the symbol arrays assigned to the respective video reels 3*a* to 3*e*, a symbol same as a certain symbol does not exist within two rows above and below the certain symbol. Therefore, two or more of the same symbols are not displayed in the same column of display regions (e.g. the column of q1*a*, q2*a* and q3*a*). For this reason, the maximum number of the same symbols displayed in the symbol display region 4 is five. Thus, when the symbol arrays shown in FIG. 6 are used (in the case of a normal unit game), a winning combination of up to 5KIND is established.

In the arrangement of the symbols of the third reel pattern shown in FIG. 7, each of a first video reel 3*a*, a second video reel 3*b*, a third video reel 3*c*, a fourth video reel 3*d*, and a fifth video reel 3*e* is assigned with a symbol array consisting of seven symbols that correspond to respective code numbers from "00" to "06".

In the symbol arrays, "SUN", "BELL", "CHERRY", "STRAWBERRY", "PLUM", "ORANGE", "APPLE", "MELON", and "WILD" are provided as types of symbols. "WILD" is a symbol which can be replaced with any one of other various types of symbols. Further, "WILD" is provided in each of the second to fourth video reels 3*b* to 3*d*, and is not provided in the first and fifth video reels 3*a* and 3*e*. Specifically, "WILD" is not provided in the far left and far right video reels.

In each of the symbol arrays assigned to the respective video reels 3*a* to 3*e*, the symbols are assigned in a manner that a symbol same as a certain symbol does not exist within two rows above and below the certain symbol. For example, in the first video reel 3*a* shown in FIG. 7, the symbol array is set so that "BELL" does not exist within two rows above and below "BELL" of the code number "02", i.e. does not exist in the code numbers "00", "01", "03" and "04". Therefore, two or more of the same symbols are not displayed in the same column of display regions (e.g. the column including q1*a*, q2*a* and q3*a*). For this reason, the maximum number of the same symbols displayed in the symbol display region 4 is five.

Further, each of the symbol arrays assigned to the respective video reels 3 is set so that symbols same as those present within two rows above and below "WILD" in one video reel do not exist within two rows above and below "WILD" in the other video reels. For example, "SUN", "BELL", "CHERRY" and "SUN" are arranged within two rows above and below "WILD" arranged in the code number "02" of the second video reel 3*b*, i.e. arranged in the code numbers "00", "01", "03" and "04". The same symbols as those mentioned above do not exist within two rows above and below "WILD" in the third and fourth video reels 3*c* and 3*d*. Specifically, "SUN", "BELL" and "CHERRY" described above do not exist in the code numbers "00", "01", "03" and "04" of the third and fourth video reels 3*c* and 3*d*.

By setting the symbol arrays of the respective video reels 3 as described above, the maximum number of the same symbols displayed in the symbol display region 4 is five, and a maximum of one "WILD" is further displayed. Therefore, when the symbol arrays shown in FIG. 7 are used (during execution of a free game), the maximum winning combination to be established for any symbol is 6KIND.

Further, in the third embodiment of the present invention, both of the aforementioned first and second reel patterns are used.

[Configuration of Circuit Included in Gaming Machine]

The configuration of the symbol arrays included in the video reels 3 of the gaming machine 1 has been described above. Next, with reference to FIG. 8, a configuration of a circuit included in the gaming machine 1 is described.

Figure 8:
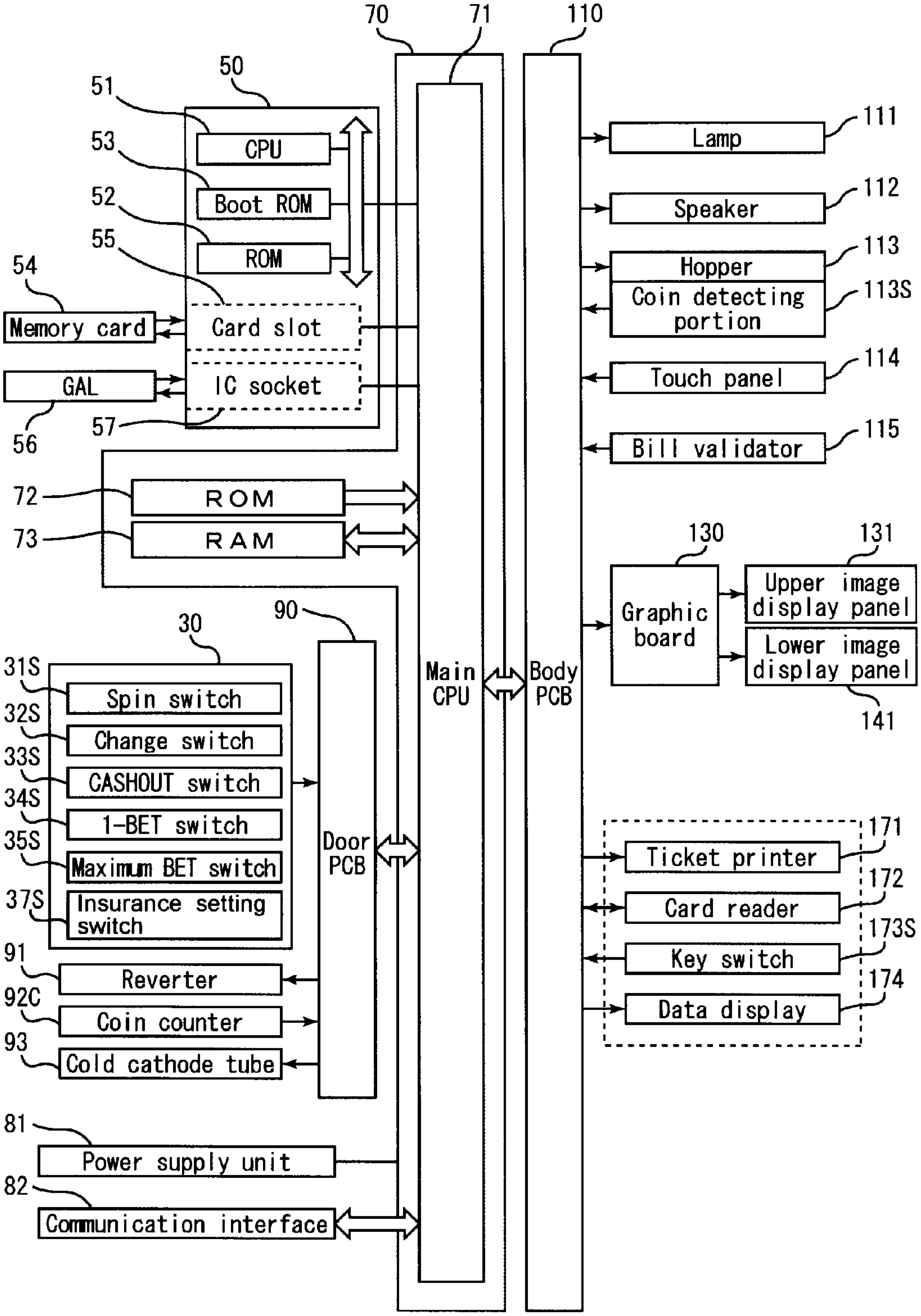
FIG. 8 is a block diagram illustrating an internal configuration of the gaming machine according to the embodiment of the present invention.

FIG. 8 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 11 to 20 which are described later). Further, the aforementioned game program includes data (see FIGS. 5 to 7) specifying the configuration of the symbol array assigned to each video reel 3.

The lottery program is a program for determining to-be stopped symbol of each video reel 3 by lottery. The to-be stopped symbol is data for determining three symbols to be displayed to the symbol display region 4 out of the 22 (7 for FIG. 7) symbols forming each symbol array. The gaming machine 1 of the present embodiment determines as the to-be stopped symbol the symbol to be displayed in a predetermined region (e.g. the upper region) out of the three regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "JP 7", and includes three symbols of "ORANGE". Hence, the former is determined at the probability of "1/22", whereas the latter is determined at the probability of "3/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the amount of a BET, the amount of a payout, the number of credits and the like; and an area that stores symbols (code numbers) determined by lottery. Furthermore, the RAM 73 stores the symbol arrays of the respective video reels 3. That is, the RAM 73 functions as a memory which store data of each symbol array of the five video reels 3.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S, a maximum BET switch 35S and a insurance setting switch 37S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified amount of a payout from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. The number-of-credits display region 142 of the lower image display panel 141 displays the number of credits stored in the RAM 73. The amount-of-payout display region 143 of the lower image display panel 141 displays the amount of a payout of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Payout Table]

The circuit configuration of the gaming machine 1 has been described above. Next, with reference to FIGS. 9 and 10, a payout table is described.

FIG. 9 is a view illustrating a payout table of a gaming machine according to first and second embodiments of the present invention. FIG. 10 is a view illustrating a payout table used in a free game according to the second embodiment of the present invention.

The payout table specifies combinations of symbols relating to winning, and the amounts of payouts. On the gaming machine 1, the scrolling of symbol arrays of the respective video reels 3 is stopped, and winning is established according to the number of the same symbols displayed consecutively from the far left display regions. According to the winning combination, a benefit such as payout of coins or start of a free game is offered to the player. It is to be noted that winning is not established (i.e. the game is lost) when the combination of symbols, which establishes winning, is not displayed in the display regions.

In the gaming machine according to the present embodiment, when the same symbols are displayed consecutively from the display regions of the far left column (the regions where the symbols of the first video reel are displayed) to the other columns in the right, a payout is generated according to the number of the same symbols displayed. For example, as shown in FIG. 21, when three "BELL" symbols are displayed consecutively (3KIND) from the display regions of the far left column, "10" is determined as the amount of payout. Based on the determined amount of payout, payout of coins is then conducted. The payout of coins is conducted by actually discharging coins from the coin payout exit 15A, by adding the determined amount of payout to the number of credits, or by issuing a ticket with a barcode.

On the other hand, as shown in FIG. 22, even though a total of four “BELL” symbols are displayed, winning is not established when no “BELL” symbols are displayed in the display regions of the far left column.

“JP7” is a symbol related to the jackpot trigger. When “JP7” symbols are displayed in the display regions of all the columns, the winning combination is “jackpot”, and the amount of jackpot is determined as the amount of payout.

“FEATURE” is a symbol related to the free game trigger. When “FEATURE” symbols are displayed in the display regions of all the columns, the winning combination is “free game trigger”, and free games start from the next game.

Further, in the payout table shown in FIG. 10, payouts corresponding to the symbol arrays shown in FIG. 7 are set. As in the case of the payout table shown in FIG. 9, when any of the symbols among “SUN”, “STRAWBERRY” and “PLUM” are displayed consecutively from the display regions of the far left column to the other columns in the right, a payout is generated according to the number of the same symbols displayed. For example, when three “SUN” symbols are displayed, 3KIND without “WILD” is established, and “20” is determined as the amount of payout. Further, in the case of 3KIND with “WILD” (i.e. 2KIND+WILD), payout corresponding to the number obtained by multiplying “20” by a predetermined multiplication factor “K” are provided, as will be described later.

[Contents of Program]

The symbol combination table has been described above. Next, with reference to FIGS. 11 to 20, the program to be executed by the gaming machine 1 is described.

<Main Control Processing>

Figure 11:
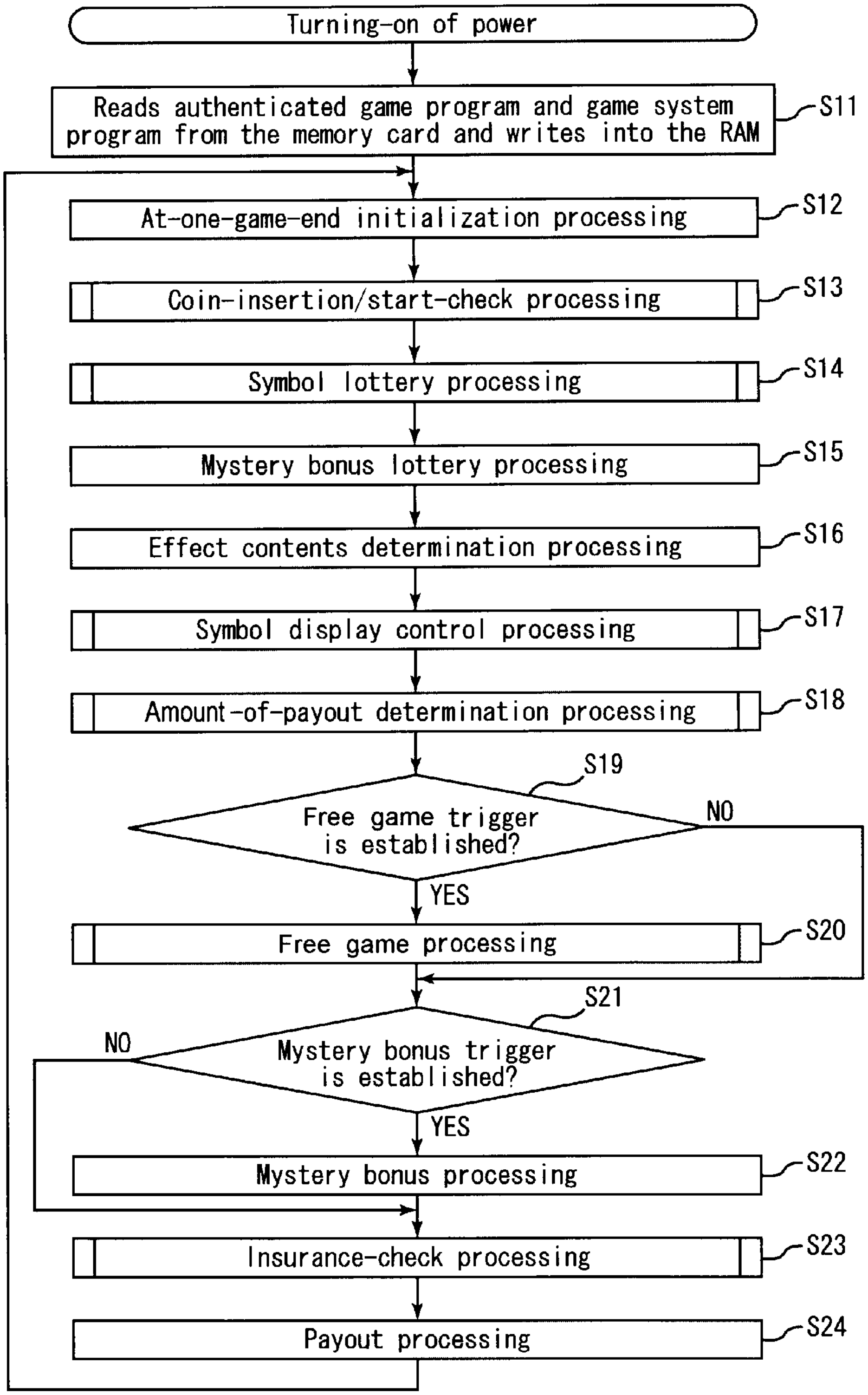
FIG. 11 is a view illustrating a flowchart of a main control processing of the gaming machine according to the embodiment of the present invention.

First, with reference to FIG. 11, main control processing is described.

FIG. 11 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the amount of a BET and the symbols determined by lottery, is cleared.

The main CPU 71 conducts coin-insertion/start-check processing which is described later with reference to FIG. 12 (step S13). In the processing, input from the BET switch and the spin switch is checked.

The main CPU 71 then conducts symbol lottery processing which is described later with reference to FIG. 15 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held.

For example, the main CPU 71 extracts a random value for mystery bonus from the numbers in a range of “0 to 99”, and establishes the mystery bonus trigger when the extracted random value is “0”.

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 16 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, three symbols including the to-be stopped symbol are displayed in the symbol display region 4. For example, when the to-be stopped symbol is the symbol associated with the code number of “10” and it is to be displayed to the upper region, the symbols associated with the respective code numbers of “11” and “12” are to be displayed to the respective central region and lower region in the symbol display region 4.

Next, the main CPU 71 conducts an amount-of-payout determination processing which is described later with reference to FIG. 17 (step S18). In the processing, the amount of a payout is determined based on the combination of symbols displayed in the total of fifteen display regions of three rows and five columns, and is stored into an amount-of-payout storage area provided in the RAM 73.

The main CPU 71 then determines whether or not the free game trigger has been established (step S19). When the main CPU 71 determines that the free game trigger has been established, the main CPU 71 conducts free game processing which is described later with reference to FIG. 19 (step S20).

After the processing of step S20 or when determining in step S19 that the free game trigger has not been established, the main CPU 71 determines whether or not the mystery bonus trigger is established (step S21). When determining that the mystery bonus trigger has been established, the main CPU 71 conducts the mystery bonus processing (step S22). In the processing, the amount of a payout (e.g. 300) being set for the mystery bonus is stored into the amount-of-payout storage area provided in the RAM 73.

After the processing of step S22 or when determining in step S21 that the mystery bonus trigger has not been established, the main CPU 71 conducts insurance-check processing which is described later with reference to FIG. 18 (step S23). In the processing, whether or not to conduct payout by the insurance is checked.

The main CPU 71 conducts payout processing (step S24). The main CPU 71 adds the value stored in the amount-of-payout storage area to a value stored in a number-of-credits storage area provided in the RAM 73. It is to be noted that operations of the hopper 113 may be controlled based on input from the CASHOUT switch 33S, and coins of the number corresponding to the value stored in the amount-of-payout storage area may be discharged from the coin payout exit 15A. Further, operations of the ticket printer 171 may be controlled and a ticket with a barcode may be issued on which a value stored in the amount-of-payout storage area is recorded. After the processing has been conducted, the processing is shifted to step S12.

<Coin-Insertion/Start-Check Processing>

Figure 12:
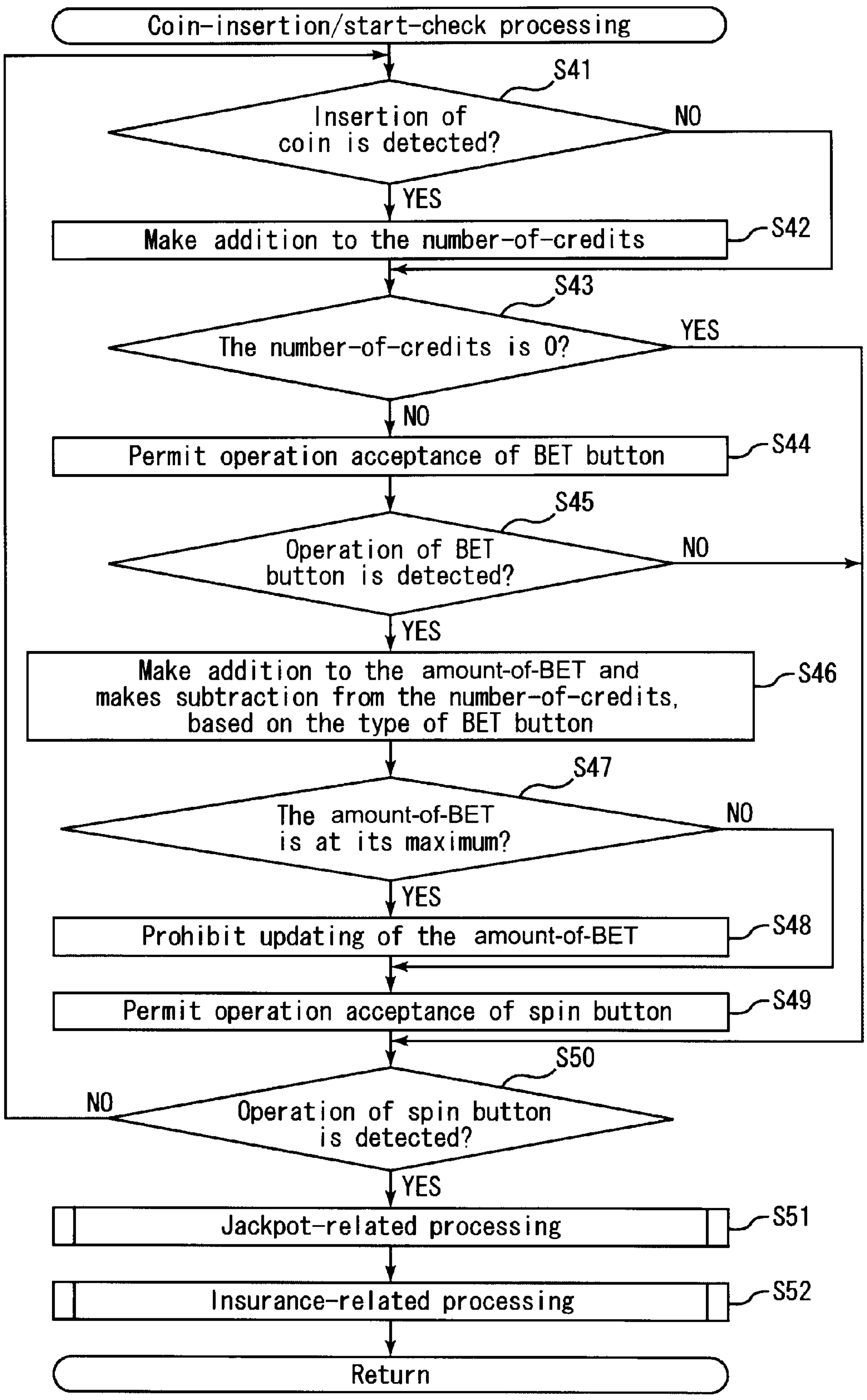
FIG. 12 is a view illustrating a flowchart of a coin-insertion/start-check processing of the gaming machine according to first and second embodiments of the present invention.

Next, with reference to FIG. 12, coin-insertion/start-check processing is described.

FIG. 12 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected by the coin counter 92C, the main CPU 71 makes an addition to the value stored in the number-of-credits storage area (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the number-of-credits storage area.

After step S42 or when determining in step S41 that the insertion of a coin has not been detected, the main CPU 71 determines whether or not the value stored in the number-of-credits storage area is zero (step S43). When the main CPU 71 determines that the value stored in the number-of-credits storage area is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a value stored in an amount-of-BET storage area provided in the RAM 73 and makes a subtraction from the value stored in the number-of-credits storage area, based on the type of the BET button (step S46).

The main CPU 71 then determines whether or not the value stored in the amount-of-BET storage area is at its maximum (step S47). When the main CPU 71 determines that the value stored in the amount-of-BET storage area is at its maximum, the main CPU 71 prohibits updating of the value stored in the amount-of-BET storage area (step S48). After step S48 or when determining in step S47 that the value stored in the amount-of-BET storage area is not at its maximum, the main CPU 71 permits operation acceptance of the spin button (step S49).

After step S49 or when determining in step S45 that the operation of any of the BET buttons has not been detected, or when determining in step S43 that the value stored in the number-of-credits storage area is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 13 (step S51). In the processing, the amount to be accumulated to the amount of jackpot is calculated, and the amount is transmitted to the external control device 200.

Next, the main CPU 71 conducts insurance-related processing which is described later with reference to FIG. 14 (step S52). In the processing, counting of the number of games is conducted which triggers a payout by the insurance. After the processing has been conducted, the coin-insertion/start-check processing is completed.

<Jackpot-Related Processing>

Figure 13:
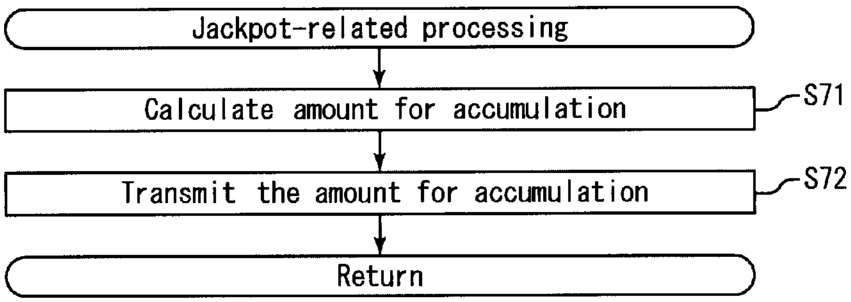
FIG. 13 is a view illustrating a flowchart of a jackpot-related processing of the gaming machine according to the embodiment of the present invention.

Now, with reference to FIG. 13, the jackpot-related processing is described.

FIG. 13 is a view illustrating a flowchart of the jackpot-related processing for the gaming machine according to the embodiment of the present invention.

First, the main CPU 71 calculates the amount for accumulation (step S71). The main CPU 71 obtains the product of the value stored in the amount-of-BET storage area and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 14:
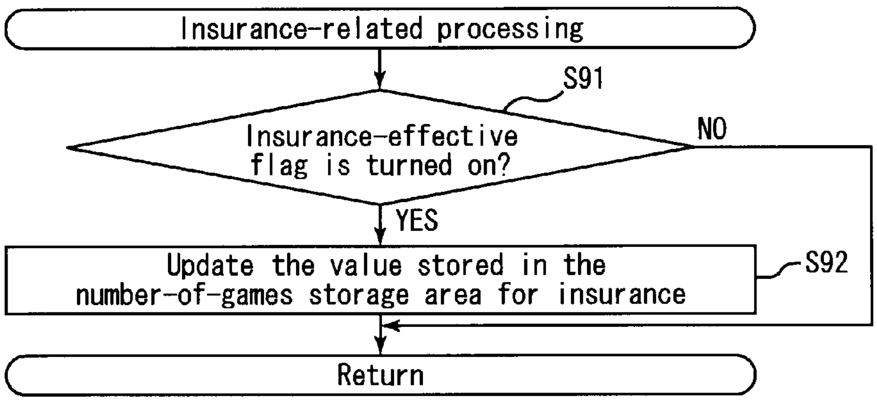
FIG. 14 is a view illustrating a flowchart of an insurance-related processing of the gaming machine according to the embodiment of the present invention.

Next, with reference to FIG. 14, the insurance-related processing is described.

FIG. 14 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 20.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a value stored in a number-of-games storage area for insurance provided in the RAM 73 (step S92). The number-of-games storage area for insurance is an area for storing the number of games up to the time of the payout by the insurance. In the processing of step S92, the main CPU 71 adds one to the value stored in the number-of-games storage area for insurance. After the processing has been conducted, the insurance-related processing is completed.

<Symbol Lottery Processing>

Figure 15:
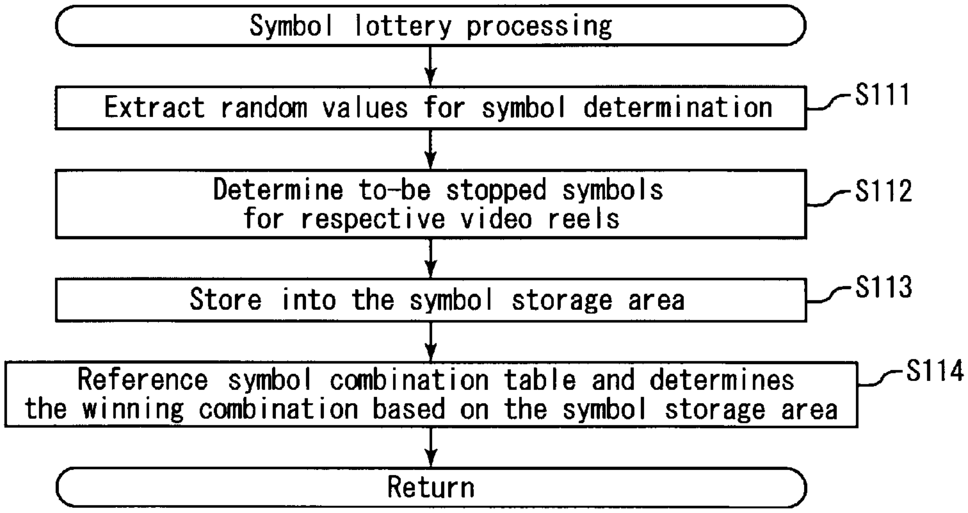
FIG. 15 is a view illustrating a flowchart of a symbol lottery processing of the gaming machine according to the embodiment of the present invention.

Next, with reference to FIG. 15, the symbol lottery processing is described.

FIG. 15 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 references the payout table (FIG. 9) and determines a winning combination based on the symbol storage area (step S114). The main CPU 71 determines whether or not the combination of symbols to be displayed in each of the display regions by the respective video reels 3 matches any of the combinations of symbols specified by the payout table, and determines the winning combination. After the processing has been conducted, the symbol lottery processing is completed.

<Symbol Display Control Processing>

Figure 16:
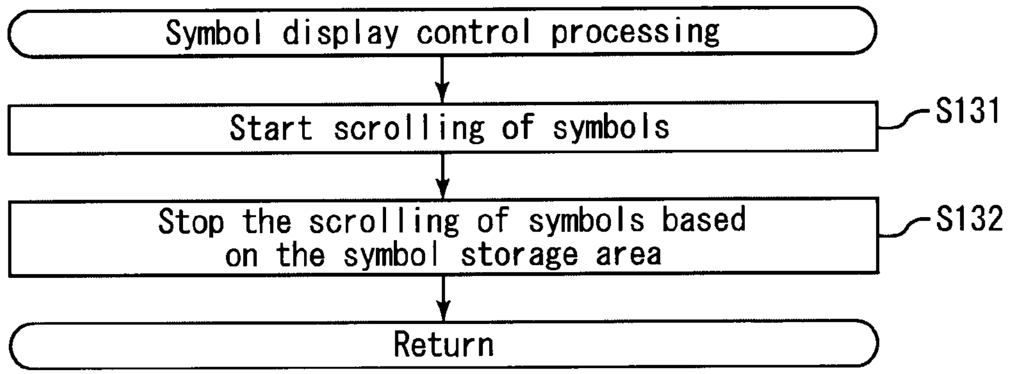
FIG. 16 is a view illustrating a flowchart of a symbol display control processing of the gaming machine according to the embodiment of the present invention.

Next, with reference to FIG. 16, the symbol display control processing is described.

FIG. 16 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Amount-of-Payout Determination Processing>

Figure 17:
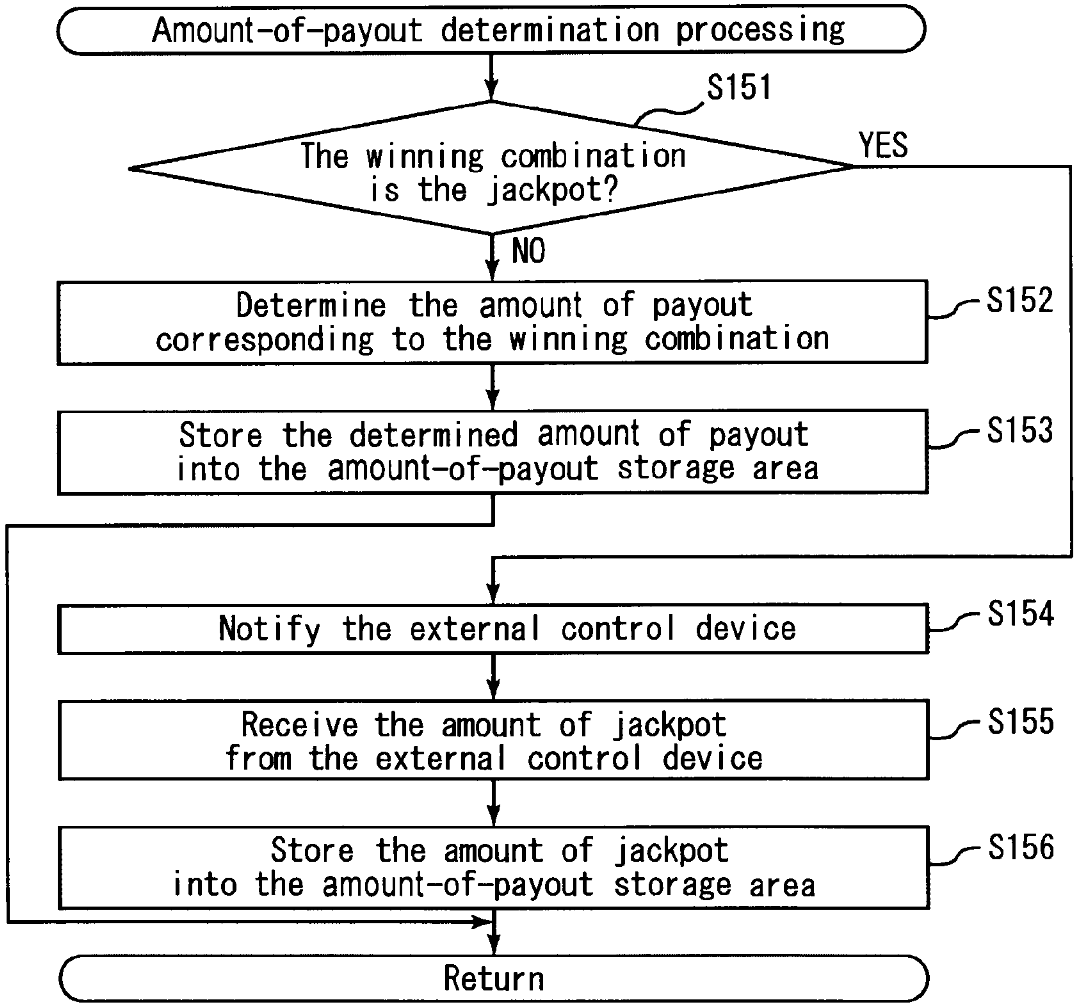
FIG. 17 is a view illustrating a flowchart of an amount-of-payout determination processing of the gaming machine according to the first embodiment of the present invention.

Next, with reference to FIG. 17, the amount-of-payout determination processing is described.

FIG. 17 is a view illustrating a flowchart of the amount-of-payout determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the amount of a payout corresponding to the winning combination (step S152). For example, when the winning combination is 3KIND of "BELL", the main CPU 71 determines "10" as the amount of a payout (see FIG. 9). It is to be noted that the main CPU 71 determines "0" as the amount of a payout in the case where the game is lost. Next, the main CPU 71 stores the determined amount of a payout into the amount-of-payout storage area (step S153). After the processing has been conducted, the amount-of-payout determination processing is completed.

When the main CPU 71 determines that the winning combination is the jackpot (i.e. when "JP7" symbols are displayed in the display regions of the five columns), the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the amount-of-payout storage area (step S156). After the processing has been conducted, the amount-of-payout determination processing is completed.

<Insurance-Check Processing>

Figure 18:
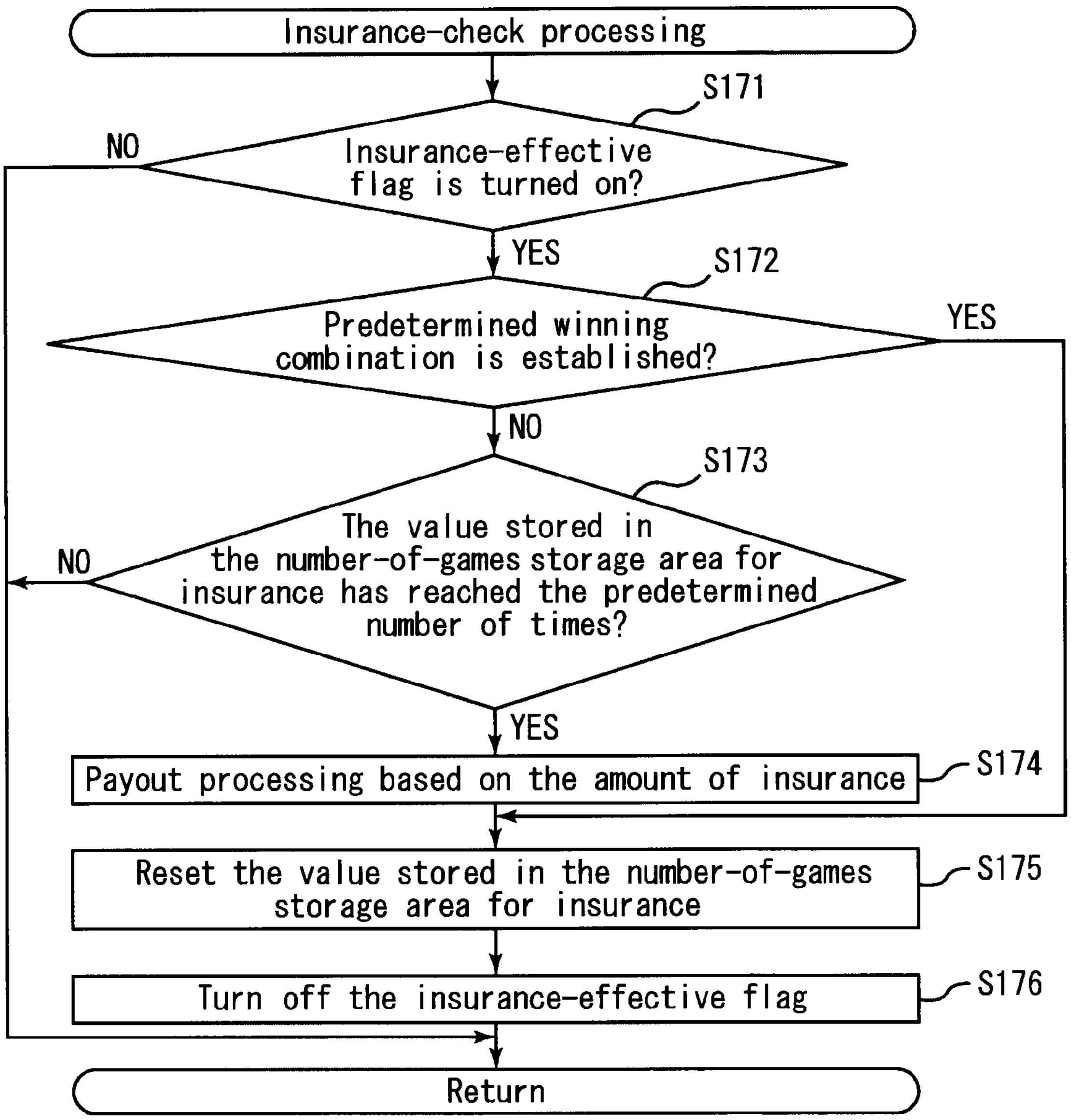
FIG. 18 is a view illustrating a flowchart of an insurance-check processing of the gaming machine according to the embodiment of the present invention.

Next, with reference to FIG. 18, the insurance-check processing is described.

FIG. 18 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, free game trigger", "jackpot" and "mystery bonus" are subjects of the predetermined winning combination.

When the main CPU 71 determines that the predetermined winning combination has not been established, the main CPU 71 determines whether or not the value stored in the number-of-games storage area for insurance has reached a predetermined number of times (e.g. 300) (step S173). When the main CPU 71 determines that the value stored in the number-of-games storage area for insurance has not reached the predetermined number of times, the main CPU 71 completes the insurance-check processing.

When the main CPU 71 determines that the value stored in the number-of-games storage area for insurance has reached the predetermined number of times, the main CPU 71 conducts payout processing based on the amount of insurance (step S174). The main CPU 71 adds an amount (e.g. 200) previously set as the amount of insurance to the value stored in the number-of-credits storage area.

After step S174 or when determining in step S172 that the predetermined winning combination has been established, the main CPU 71 resets the value stored in the number-of-games storage area for insurance (step S175). Next, the main CPU 71 turns the insurance-effective flag off (step S176). After the processing has been conducted, the insurance-check processing is completed.

<Free Game Processing>

Figure 19:
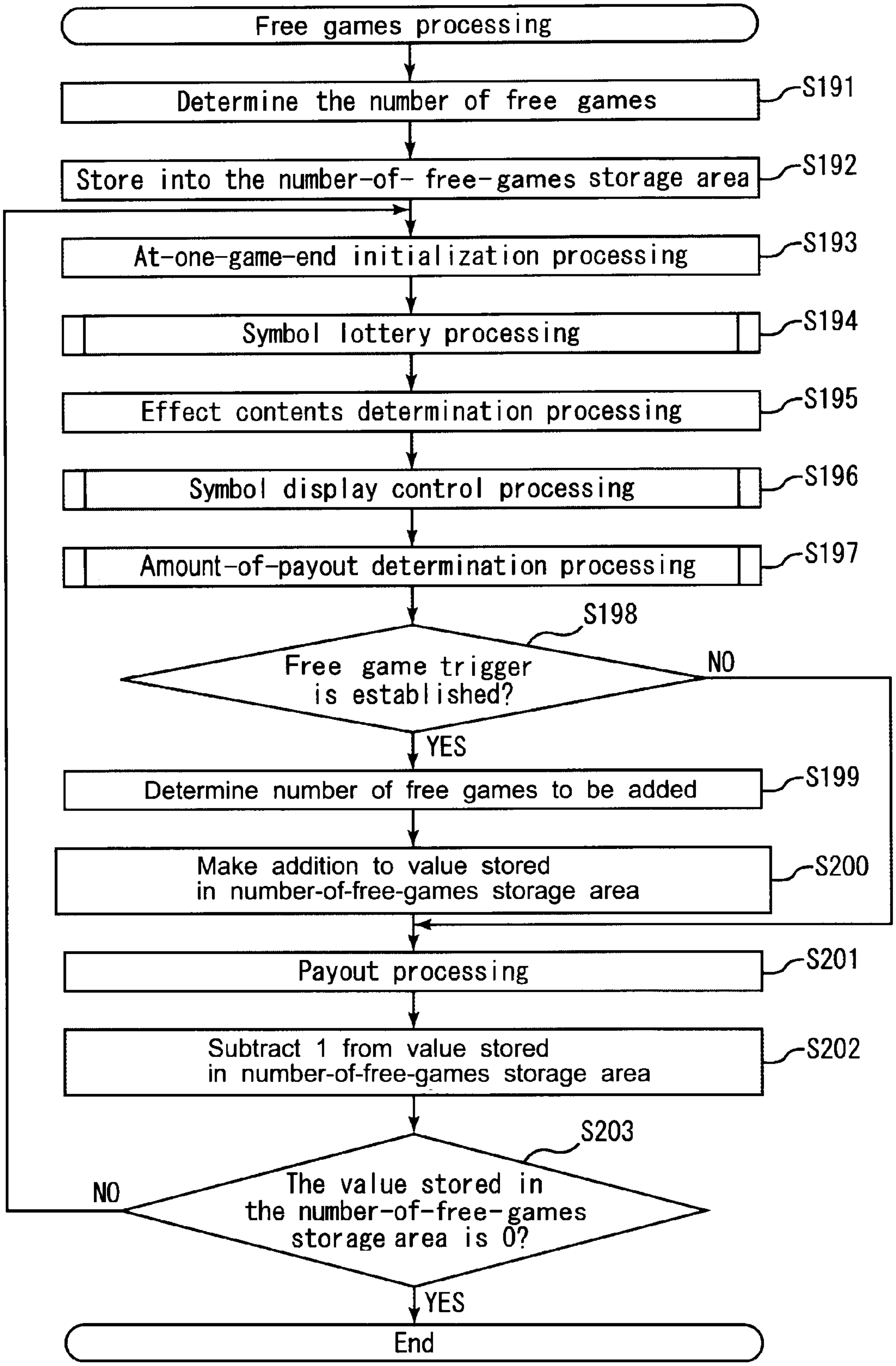
FIG. 19 is a view illustrating a flowchart of a free game processing of the gaming machine according to the first embodiment of the present invention.

Next, with reference to FIG. 19, the free game processing is described.

FIG. 19 is a view illustrating a flowchart of the free game processing for the gaming machine according to the embodiment of the present invention.

The main CPU 71 first determines the number of free games (step S191). The main CPU 71 extracts a random value for number-of-free-games determination, and determines any one of the various numbers of free games such as "50", "70" and "100" by lottery.

Next, the main CPU 71 stores the determined number of free games into a number-of-free-games storage area provided in the RAM 73 (step S192).

The main CPU 71 then conducts at-one-game-end initialization processing in the same way as the processing of step S12 described with reference to FIG. 11 (step S193). The main CPU 71 then conducts the symbol lottery processing described with reference to FIG. 15 (step S194). Then, the main CPU 71 conducts the effect contents determination processing in the same way as the processing of step S16 described with reference to FIG. 11 (step S195). Next, the main CPU 71 conducts the symbol display control processing described with reference to FIG. 16 (step S196). The main CPU 71 then conducts the amount-of-payout determination processing described with reference to FIG. 17 (step S197).

Next, the main CPU 71 determines whether or not the free game trigger has been established (step S198). That is, the main CPU 71 determines whether or not five "FEATURE" symbols illustrated in FIG. 9 are displayed during the free game. When the main CPU 71 determines that the free game trigger has been established, the main CPU 71 determines the number of free games to be added (step S199). In the same way as the aforementioned processing of step S191, the main CPU 71 determines the number of free games. The main CPU 71 then adds the determined number of free games to the value stored in the number-of-free-games storage area (step S200).

After the processing of step S200 or when determining in step S198 that the free game trigger has not been established, the main CPU 71 conducts the payout processing (step S201). In the payout processing, the main CPU 71 adds the value stored into the amount-of-payout storage area in the aforementioned amount-of-payout determination processing of step S197 to a value stored in an amount-of-payout storage area for free games. The amount-of-payout storage area for free games is an area for storing a total of the amounts of payouts determined during the free games.

When the free game processing has been completed, the main CPU 71 adds the value stored in the amount-of-payout storage area for free games to the value stored in the number-of-credits storage area provided in the RAM 73, in the payout processing of step S24 described with reference to FIG. 11. That is, the total of the amounts of payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S202). Next, the main CPU 71 determines whether or not the value stored in the number-of-free-games storage area is zero (step S203). When the main CPU 71 determines that the value stored in the number-of-free-games storage area is not zero, the main CPU 71 shifts the processing to step S193. On the other hand, when the main CPU 71 determines that the value stored in the number-of-free-games storage area is zero, the main CPU 71 completes the free game processing. When the free game processing has been completed, the processing is shifted to the processing of step S21 described with reference to FIG. 11.

<Insurance Selection Processing>

Figure 20:
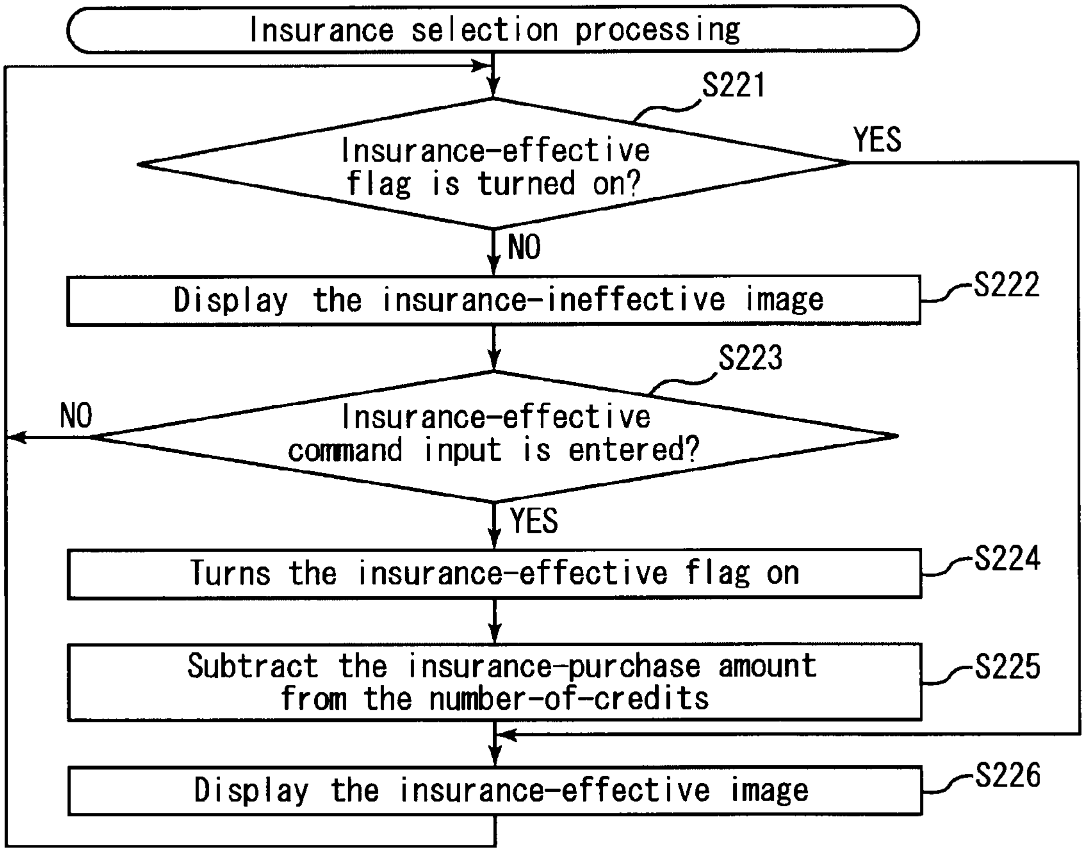
FIG. 20 is a view illustrating a flowchart of an insurance selection processing of the gaming machine according to the embodiment of the present invention.

Next, with reference to FIG. 20, the insurance selection processing is described.

FIG. 20 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the value stored in the number-of-credits storage area (step S225). In the present embodiment, an amount corresponding to, for example, one dollar is subtracted from the value stored in the number-of-credits storage area. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the value stored in the number-of-credits storage area when the insurance condition is satisfied. After the processing has been conducted, the processing is shifted to step S221.

In the gaming machine according to the first embodiment, in each of the symbol arrays of the video reels 3*a*, a symbol same as a certain symbol does not exist within two rows above and below the certain symbol. Thus, the same symbols are not displayed in the same column of display regions. Therefore, the maximum number of the same symbols displayed in the symbol display region 4 is five.

Further, since a maximum of one WILD symbol is displayed in addition to the five same symbols, the maximum winning combination that can be established for the same symbol is 5KIND+WILD, i.e. 6KIND. Therefore, the player is allowed to have expectations of winning a large amount of payouts. Further, since a combination exceeding 6KIND is not established for the same symbol, a maximum payout can be determined.

It is to be noted that, in the aforementioned embodiment, the description is given of the example where the payout is determined according to the number of the same symbols displayed consecutively from the far left column to the other columns in the right. However, the present invention is not limited thereto, but the payout may be determined according to the number of the same symbols displayed consecutively from the far right column to the other columns in the left. Further, the payout may be determined according to the number of the same symbols displayed in the fifteen display regions.

[Second Embodiment]

Next, a second embodiment of the present invention is described. A gaming machine according to the second embodiment is different from that of the aforementioned first embodiment in using the video reels 3 having the symbol arrays shown in FIGS. 6 and 7. The gaming machine according to the second embodiment uses the video reels 3 having the symbol arrays shown in FIG. 6 during execution of the normal games, and uses the video reels 3 having the symbol arrays shown in FIG. 7 during execution of the free games.

Each of the symbol arrays shown in FIG. 6 is set so that two rows above and below a certain symbol may not include the symbol same as the certain symbol. Further, the symbol arrays include no WILD symbol. Therefore, during execution of the normal game, the maximum winning combination is 5KIND of the same symbols.

Further, as described above, in the symbol arrays shown in FIG. 7, a maximum of five of the same symbols are displayed, and a maximum of one WILD symbol is displayed in this case.

Further, a maximum of two WILD symbols are displayed when four of the same symbols are displayed, and a maximum of three WILD symbols are displayed when three of the same symbols are displayed. Therefore, the maximum winning combination is 6KIND of the same symbols. Further, the payout table shown in FIG. 9 is used during execution of the normal game, and the payout table shown in FIG. 10 is used during execution of the free game.

The gaming machine according to the second embodiment is different from the gaming machine described in the first embodiment in the free game processing. Thus, with reference to FIG. 23, the free game processing is described below.

<Free Game Processing of the Second Embodiment>

Figure 23:
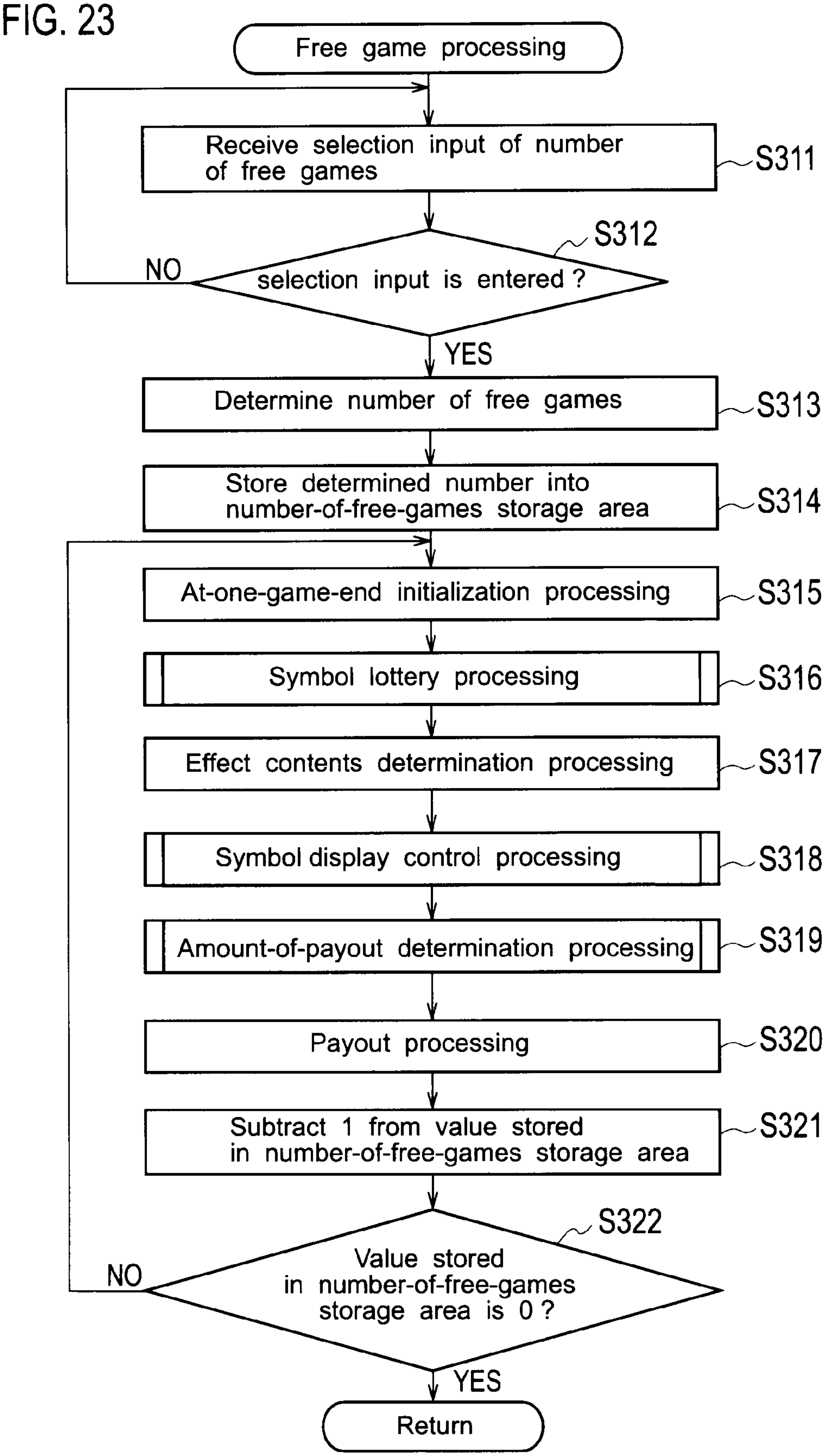
FIG. 23 is a view illustrating a flowchart of a free game processing of the gaming machine according to the second embodiment of the present invention.

FIG. 23 is a view illustrating a flowchart of the free game processing for the gaming machine according to the second embodiment of the present invention.

Figure 24:
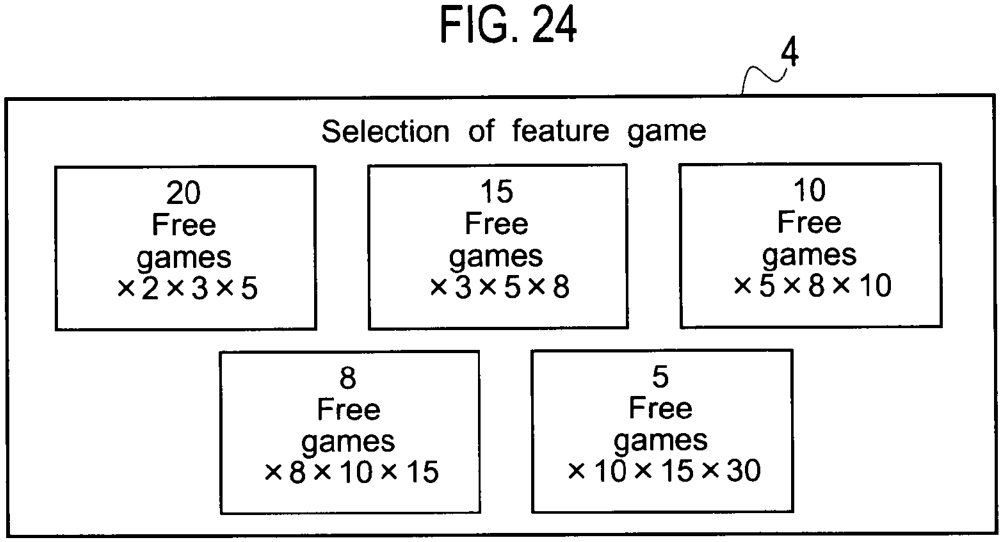
FIG. 24 is an explanatory view illustrating a symbol display region in which a selection image for a number of free games is displayed, of the gaming machine according to the embodiment of the present invention.

First, the main CPU 71 receives a selection input of the number of free games (step S311). In this processing, as shown in FIG. 24, selection screens each showing different numbers of free games are displayed in a symbol display region 4 of a lower image display panel 141, and an operation input entered by a player is received. In the example shown in FIG. 24, five selection screens respectively for twenty, fifteen, ten, eight and five games are displayed in the symbol display region 4, and the player can select any one of the selection screens. It is to be noted that various types of multiplication factors are set for each of the numbers of free games, and any one of the multiplication factors is selected. As described later, when a winning combination including a WILD symbol is established, the amount of payout is multiplied by the selected multiplication factor (which is K). For example, when the number of free games selected is twenty, one multiplication factor is selected from among three types of multiplication factors, namely 2, 3 and 5. When a winning combination including a WILD symbol is established by execution of a free game, the amount of payout is multiplied by the selected multiplication factor K.

It is to be noted that, when the number of free games selected is fifteen, a multiplication factor is arbitrarily selected from three types of multiplication factors, namely 3, 5 and 8. When the number of free games selected is ten, a multiplication factor is arbitrarily selected from three types of multiplication factors, namely 5, 8 and 10. When the number of free games selected is eight, a multiplication factor is arbitrarily selected from three types of multiplication factors, namely 8, 10 and 15. When the number of free games selected is five, a multiplication factor is arbitrarily selected from three types of multiplication factors, namely 10, 15 and 30. In other words, smaller the number of free games is, higher the multiplication factor of the payout is.

The main CPU 71 determines whether or not an operation input has been entered by the player (step S312).

When determining that the operation input has been entered by the player, the main CPU 71 determines the number of free games to be executed (step S313).

The main CPU 71 stores the determined number of free games into a number-of-free-games storage area provided in the RAM 73 (step S314).

The main CPU 71 then conducts at-one-game-end initialization processing in the same way as the processing of step S12 described with reference to FIG. 11 (step S315). The main CPU 71 then conducts the symbol lottery processing described with reference to FIG. 15 (step S316). In this case, the symbol lottery processing is conducted using the video reels including the symbol arrays shown in FIG. 7. Specifically, unlike the normal game, symbol arrays including WILD symbols are used in the free game.

Then, the main CPU 71 conducts the effect contents determination processing in the same way as the processing of step S16 described with reference to FIG. 11 (step S317). Next, the main CPU 71 conducts the symbol display control processing described with reference to FIG. 16 (step S318). The main CPU 71 then conducts amount-of-payout determination processing (step S319). The amount-of-payout determination processing is described in detail later with reference to FIG. 25.

The main CPU 71 conducts payout processing (step S320). In the payout processing, the main CPU 71 adds the value stored into the amount-of-payout storage area in the aforementioned amount-of-payout determination processing of step S319 to a value stored in an amount-of-payout storage area for free games. The amount-of-payout storage area for free games is an area for storing a total amount of payouts determined during the free games.

Upon completion of the free game processing, the main CPU 71 adds the value stored in the amount-of-payout storage area for free games to the value stored in the number-of-credits storage area provided in the RAM 73, in the payout processing of step S24 described with reference to FIG. 11. That is, the total amount of payouts determined during the free games is collectively paid out. It is to be noted that coins may be discharged from the coin payout exit 15A, or a ticket with a barcode may be issued.

Next, the main CPU 71 subtracts one from the value stored in the number-of-free-games storage area (step S321). Next, the main CPU 71 determines whether or not the value stored in the number-of-free-games storage area is zero (step S322). When determining that the value stored in the number-of-free-games storage area is not zero, the main CPU 71 shifts the processing to step S315. On the other hand, when determining that the value stored in the number-of-free-games storage area is zero, the main CPU 71 completes the free game processing. Upon completion of the free game processing, the processing is shifted to the processing of step S21 described with reference to FIG. 11.

<Amount-of-Payout Determination Processing of the Second Embodiment>

Figure 25:
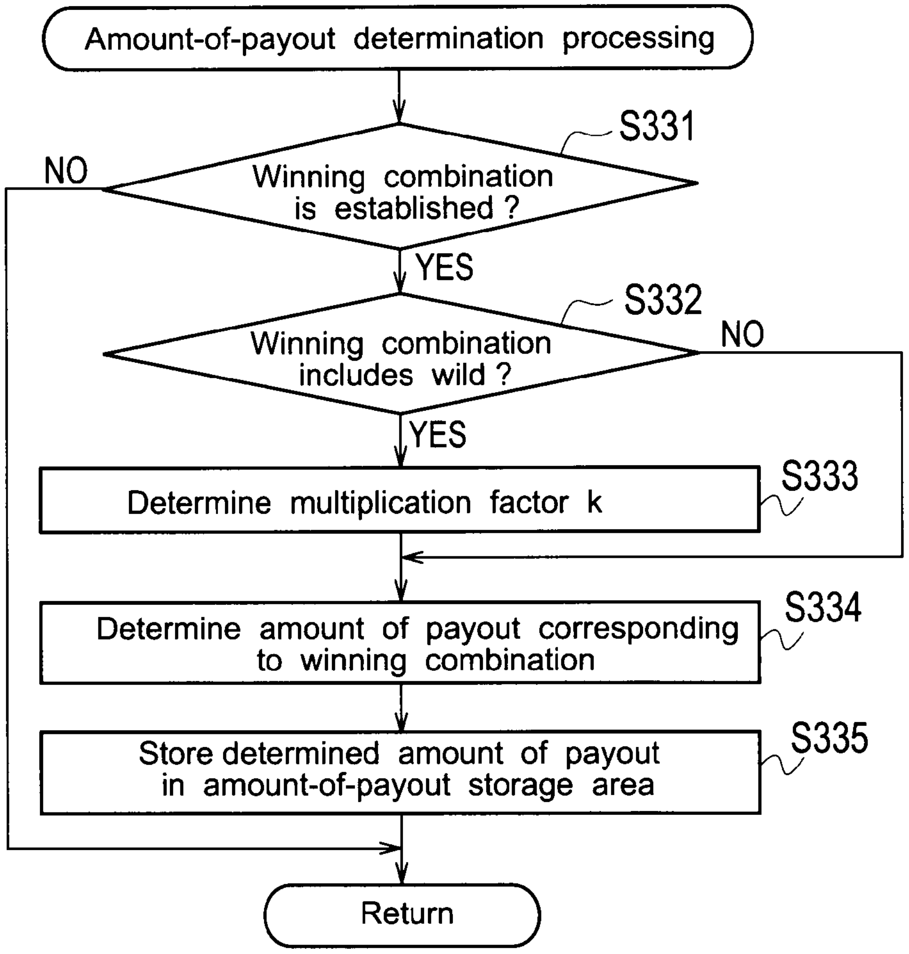
FIG. 25 is a view illustrating a flowchart of an amount-of-payout determination processing of the gaming machine according to the second embodiment of the present invention.

Next, with reference to a flowchart shown in FIG. 25, the amount-of-payout determination processing is described.

First, the main CPU 71 determines whether or not a winning combination has been established (step S331). In the processing, the main CPU 71 determines whether or not a combination of 3KIND or more of "SUN", "STRAWBERRY" or "PLUM" has been established on the basis of the symbol combinations shown in FIG. 10.

Figure 26:
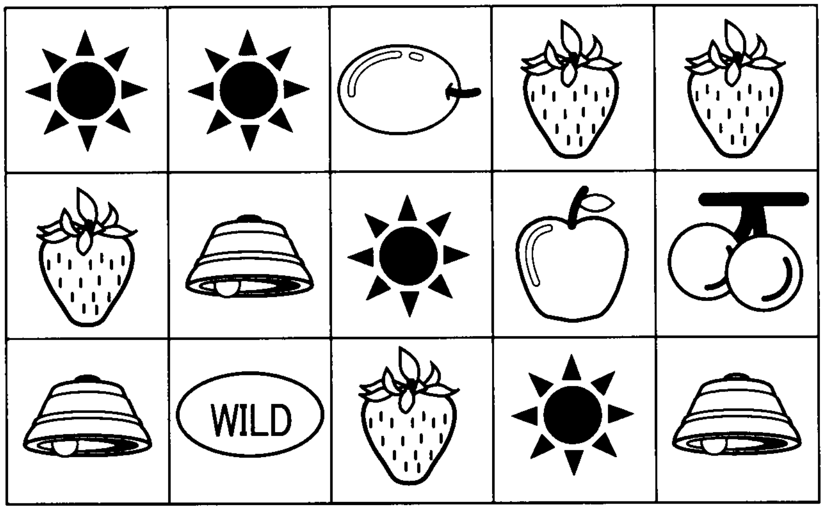
FIG. 26 is a view illustrating 4KIND of SUN symbols and WILD displayed in the gaming machine according to the embodiment of the present invention.
Figure 27:
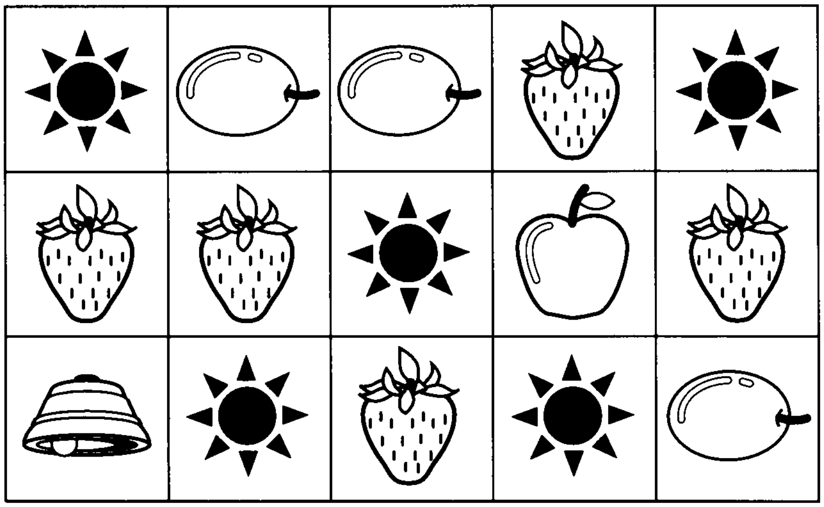
FIG. 27 is a view illustrating 5KIND of SUN symbols displayed in the gaming machine according to the embodiment of the present invention.

When determining that no winning combination has been established, the main CPU 71 completes the processing. On the other hand, when determining that a winning combination has been established, the main CPU 71 determines whether or not the winning combination includes a WILD symbol (step S332). For example, as shown in FIG. 26, when four SUN symbols are displayed consecutively from the far left column and a WILD symbol is also displayed in the symbol display region 4, 5KIND (with WILD) is established, and then the processing is shifted to step S333. On the other hand, as shown in FIG. 27, when five SUN symbols are displayed consecutively from the far left column in the symbol display region 4, 5KIND (without WILD) is established, and then the processing is shifted to step S334.

When determining that the winning combination includes a WILD symbol, the main CPU 71 determines a multiplication factor K (step S333). The multiplication factor K is determined according to the number of free games inputted by the number-of-free-games selection input processing as described above. For example, when selection for twenty free games is made on the display screen shown in FIG. 24, any one of multiplication factors, 2, 3 and 5, is selected and is set to be the multiplication factor K.

The main CPU 71 determines the amount of payout corresponding to the winning combination (step S334). In the processing, the amount of payout is determined based on the payout table shown in FIG. 10. Specifically, when the winning combination includes a WILD symbol, a value obtained by multiplying a value shown in FIG. 10 by K is determined as the amount of payout. Therefore, in winning combinations of the same number of KIND, a winning combination including a WILD symbol has a larger amount of payout than a winning combination including no WILD symbol.

The main CPU 71 stores the determined amount of payout in the amount-of-payout storage area (step S335). Upon completion of this processing, the main CPU 71 completes the amount-of-payout determination processing.

In the gaming machine according to the second embodiment, each of the video reels 3 (see FIG. 7) used during execution of the free game is set in a manner that, a symbol same as a certain symbol does not exist within two rows above and below the certain symbol. Thus, the same symbols are not displayed in the same column of display regions. Therefore, the maximum number of the same symbols displayed in the symbol display region 4 is five.

Further, since a maximum of one WILD symbol is displayed in addition to the five same symbols, the maximum winning combination that can be established for the same symbol is 5KIND+WILD, i.e. 6KIND. Therefore, the player is allowed to have expectations of winning a large amount of payouts. Further, since a combination exceeding 6KIND is not established for the same symbol, a maximum payout can be determined.

Further, in the gaming machine according to the second embodiment, when a winning combination including a WILD symbol is established, the amount of payout is multiplied by the multiplication factor K. Therefore, the player is allowed to have expectations of winning a large amount of payouts.

[Third Embodiment]

Next, a third embodiment of the present invention is described. A gaming machine according to the third embodiment is different from that of the aforementioned first embodiment in using the video reels 3 having the symbol arrays of the first reel pattern shown in FIG. 5 during execution of the normal games, and in selecting any one of the first reel pattern shown in FIG. 5 and the second reel pattern shown in FIG. 6 during execution of the free games. To be more specific, the gaming machine according to the third embodiment counts the number of maximum BETs in the normal games before execution of the free games, executes the free games using the first reel pattern when the count value has reached a predetermined value X1, and executes the free game using the second reel pattern shown in FIG. 6 when the count value is less than the predetermined value X1.

In each of the symbol arrays of the second reel pattern, a symbol same as a certain symbol does not exist within two rows above and below the certain symbol. Further, the symbol arrays include no WILD symbol. Therefore, when the second reel pattern is used, the maximum winning combination for the same symbol is 5KIND.

Further, as described above, in the symbol arrays of the first reel pattern, a "WILD" symbol is provided in each of the second to fourth video reels 3*b* to 3*d*. Therefore, when the first reel pattern is used, the maximum winning combination for the same symbol is 6KIND (5KIND+WILD). Further, as can be understood from the payout table shown in FIG. 9, a possibility of winning more payouts is increased.

<Coin-Insertion/Start-Check Processing of the Third Embodiment>

With reference to a flowchart shown in FIG. 28, coin-insertion/start-check processing for the gaming machine according to the third embodiment is described below.

First, the main CPU 71 determines whether or not insertion of a coin has been detected by the coin counter 92C (step S351). When determining that the insertion of a coin has been detected, the main CPU 71 makes an addition to the value stored in the number-of-credits storage area (step S352). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the number-of-credits storage area.

After step S352 or when determining in step S351 that the insertion of a coin has not been detected, the main CPU 71 determines whether or not the value stored in the number-of-credits storage area is zero (step S353). When the main CPU 71 determines that the value stored in the number-of-credits storage area is not zero, the main CPU 71 permits operation acceptance of the BET buttons (step S354).

Next, the main CPU 71 determines whether or not operation of any of the BET buttons has been detected (step S355). When the main CPU 71 determines that the BET switch has detected press of the BET button by the player, the main CPU 71 makes an addition to a value stored in the amount-of-BET storage area provided in the RAM 73 and makes a subtraction from the value stored in the number-of-credits storage area, based on the type of the BET button (step S356).

The main CPU 71 then determines whether or not the value stored in the amount-of-BET storage area is at its maximum (step S357). When the main CPU 71 determines that the value stored in the amount-of-BET storage area is at its maximum, the main CPU 71 increments a count value X of a counter for counting the number of maximum BETs set in the RAM 73. Specifically, the count value X is set to X+1 (step S358). Further, the main CPU 71 prohibits updating of the value stored in the amount-of-BET storage area (step S359). After step S359 or when determining in step S357 that the value stored in the amount-of-BET storage area is not at its maximum, the main CPU 71 permits operation acceptance of the spin button (step S360).

After step S360 or when determining in step S355 that the operation of any of the BET buttons has not been detected, or when determining in step S353 that the value stored in the number-of-credits storage area is zero, the main CPU 71 determines whether or not operation of the spin button has been detected (step S361). When the main CPU 71 determines that the operation of the spin button has not been detected, the processing is shifted to step S351.

When the main CPU 71 determines that the operation of the spin button has been detected, the main CPU 71 conducts the jackpot-related processing described with reference to FIG. 13 (step S362). In the processing, the amount to be accumulated to the amount of jackpot is calculated, and the amount is transmitted to the external control device 200.

Next, the main CPU 71 conducts the insurance-related processing described with reference to FIG. 14 (step S363). In the processing, counting of the number of games is conducted which triggers a payout by the insurance. After the processing has been conducted, the coin-insertion/start-check processing is completed.

<Free Game Processing of the Third Embodiment>

Figure 29:
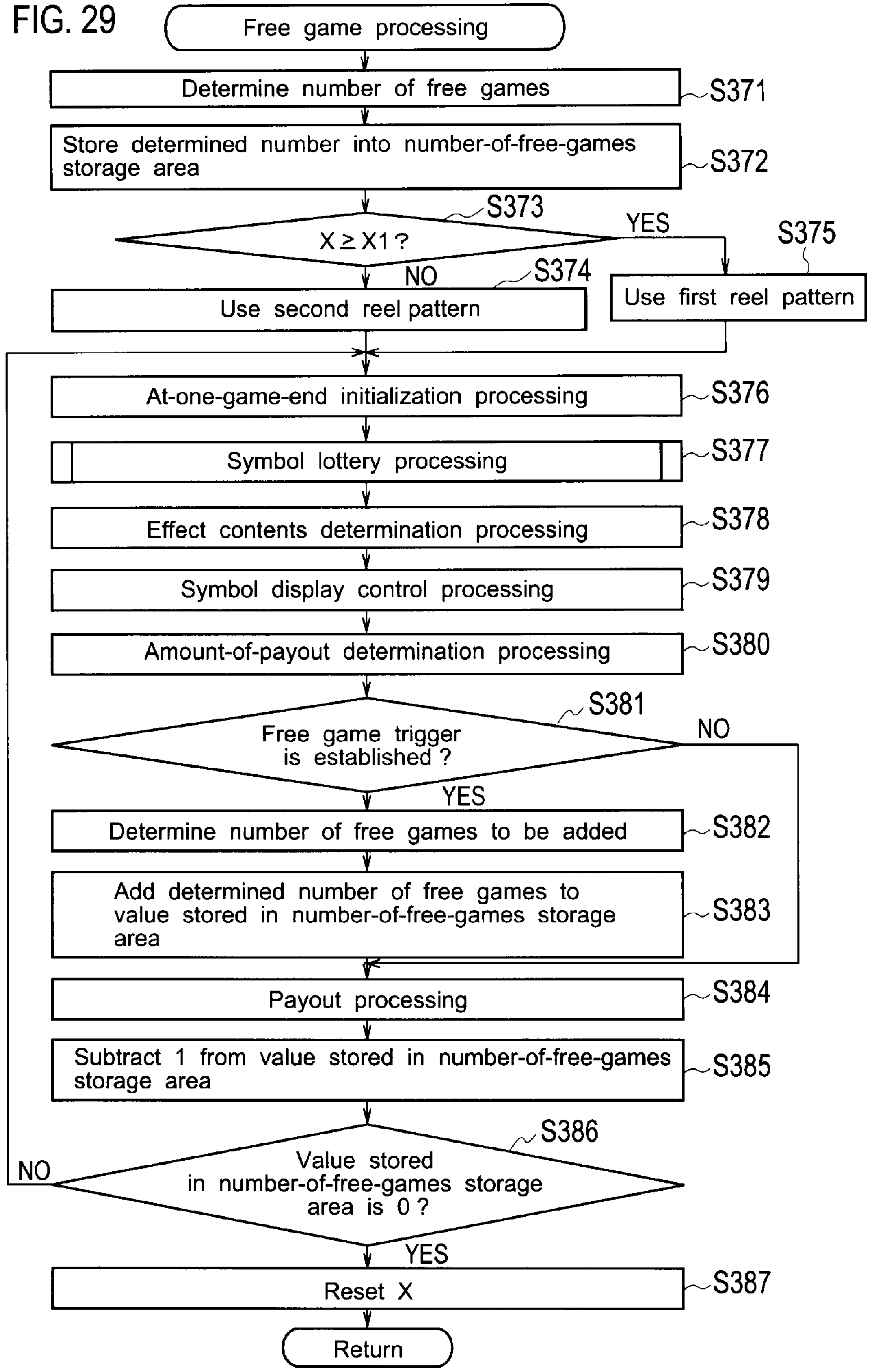
FIG. 29 is a view illustrating a flowchart of a free game processing of the gaming machine according to the third embodiment of the present invention.

Next, with reference to FIG. 29, free game processing according to the third embodiment is described. FIG. 29 is a view illustrating a flowchart of the free game processing for the gaming machine according to the third embodiment of the present invention.

The main CPU 71 first determines the number of free games (step S371). The main CPU 71 extracts a random value for number-of-free-games determination, and determines any one of the various numbers of free games such as "50", "70" and "100" by lottery.

Next, the main CPU 71 stores the determined number of free games into a number-of-free-games storage area provided in the RAM 73 (step S372).

Figure 28:
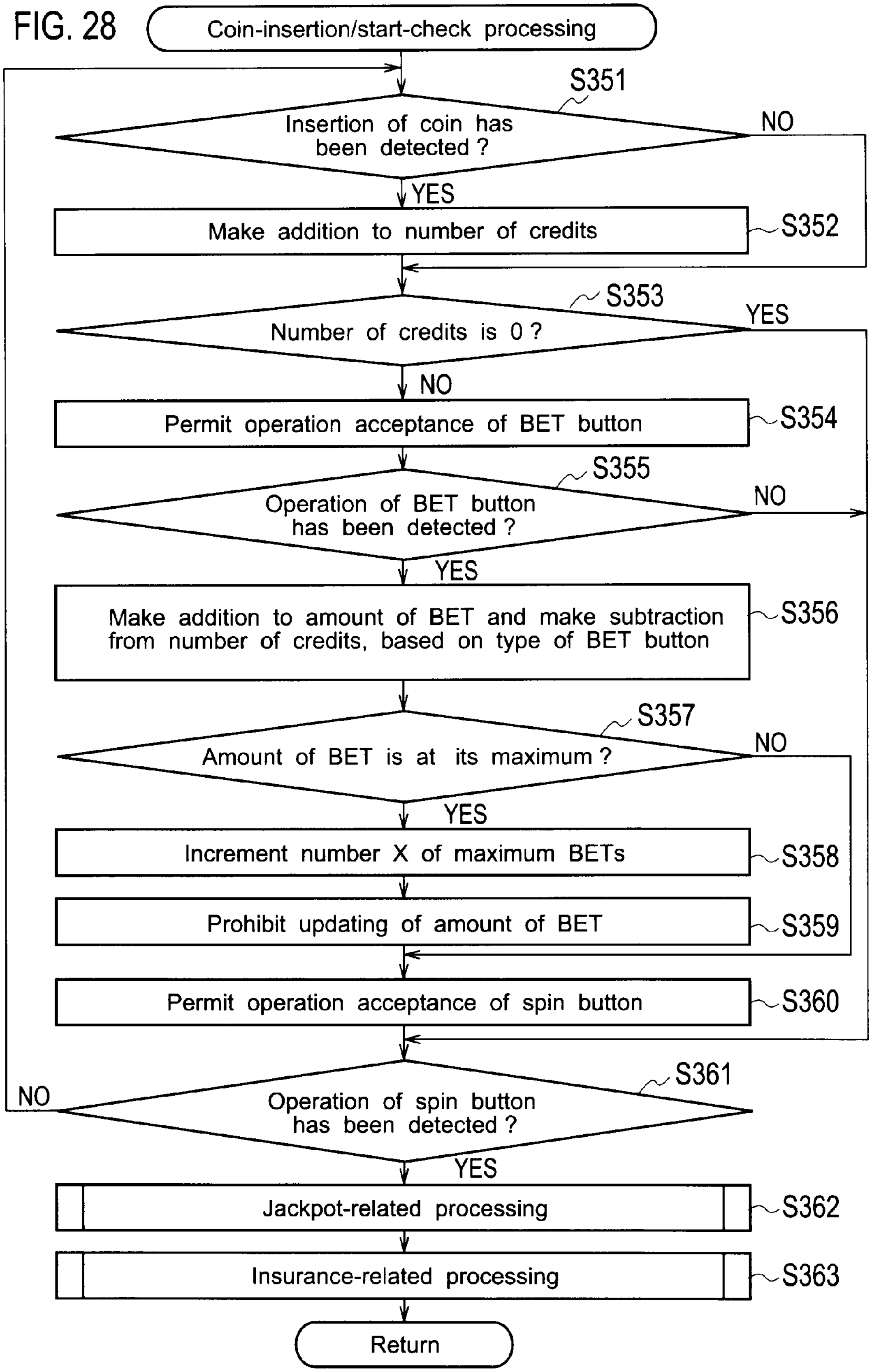
FIG. 28 is a view illustrating a flowchart of a coin-insertion/start-check processing of the gaming machine according to a third embodiment of the present invention.

The main CPU 71 determines whether or not the count value X indicating the number of maximum BETs counted in the processing of step S358 of FIG. 28 is not less than a preset predetermined value X1 (step S373). When X≧X1 is established, the symbol arrays set in the first reel pattern shown in FIG. 5 are used (step S375). On the other hand, when X<X1 is established, the symbol arrays set in the second reel pattern shown in FIG. 6 are used (step S374). Specifically, when the number X of maximum BETs is not less than the predetermined value X1, the reel pattern including WILD symbols can be used.

The main CPU 71 then conducts at-one-game-end initialization processing in the same way as the processing of step S12 described with reference to FIG. 11 (step S376). The main CPU 71 then conducts the symbol lottery processing described with reference to FIG. 15 (step S377). Then, the main CPU 71 conducts the effect contents determination processing in the same way as the processing of step S16 described with reference to FIG. 11 (step S378). Next, the main CPU 71 conducts the symbol display control processing described with reference to FIG. 16 (step S379). The main CPU 71 then conducts the amount-of-payout determination processing described with reference to FIG. 17 (step S380).

Next, the main CPU 71 determines whether or not the free game trigger has been established (step S381). When determining that the free game trigger has been established, the main CPU 71 determines the number of free games to be added (step S382). In the same way as the aforementioned processing of step S371, the main CPU 71 determines the number of free games. The main CPU 71 then adds the determined number of free games to the value stored in the number-of-free-games storage area (step S383).

After the processing of step S383 or when determining in step S381 that the free game trigger has not been established, the main CPU 71 conducts the payout processing (step S384). In the payout processing, the main CPU 71 adds the value stored into the amount-of-payout storage area in the aforementioned amount-of-payout determination processing of step S380 to a value stored in an amount-of-payout storage area for free games. The amount-of-payout storage area for free games is an area for storing a total of the amounts of payouts determined during the free games.

Upon completion of the free game processing, the main CPU 71 adds the value stored in the amount-of-payout storage area for free games to the value stored in the number-of-credits storage area provided in the RAM 73, in the payout processing of step S24 described with reference to FIG. 11. That is, the total of the amounts of payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S385). Next, the main CPU 71 determines whether or not the value stored in the number-of-free-games storage area is zero (step S386). When the main CPU 71 determines that the value stored in the number-of-free-games storage area is not zero, the main CPU 71 shifts the processing to step S376. On the other hand, when the main CPU 71 determines that the value stored in the number-of-free-games storage area is zero, the main CPU 71 resets the count value X indicating the number of games on which maximum BETs have been made (step S387), and completes the free game processing. Upon completion of the free game processing, the processing is shifted to the processing of step S21 described with reference to FIG. 11.

In the gaming machine according to the third embodiment, in each of the symbol arrays of the respective video reels 3, a symbol same as a certain symbol does not exist within two rows above and below the certain symbol. Thus, the same symbols are not displayed in the same column of display regions. Therefore, the maximum number of the same symbols displayed in the symbol display region 4 is five.

Further, since a maximum of one WILD symbol is displayed in addition to the five same symbols, the maximum winning combination that can be established for the same symbol is 5KIND+WILD, i.e. 6KIND. Therefore, the player is allowed to have expectations of winning a large amount of payouts. Further, since a combination exceeding 6KIND is not established for the same symbol, a maximum payout can be determined.

It is to be noted that, in the aforementioned embodiment, the description is given of the example where the payout is determined according to the number of the same symbols displayed consecutively from the far left column to the other columns in the right. However, the present invention is not limited thereto, but the payout may be determined according to the number of the same symbols displayed consecutively from the far right column to the other columns in the left. Further, the payout may be determined according to the number of the same symbols displayed in the fifteen display regions.

Further, when the number X of games on which maximum BETs have been made has reached a value not less than a preset predetermined value X1 before start of the insurance, the second reel pattern which allows the player to have expectations for a large amount of payout is used. Thus, the player can be motivated to make a maximum BET.

[Fourth Embodiment]

Next, a fourth embodiment of the present invention is described. The fourth embodiment is different from the aforementioned first embodiment in the coin-insertion/start-check processing shown in FIG. 12, the insurance-related processing shown in FIG. 14, the insurance-check processing shown in FIG. 18, and the free game processing shown in FIG. 19. Notes that the description of the coin-insertion/start-check processing is abbreviated because it is the same as a processing shown in FIG. 28.

<Insurance-Related Processing of the Fourth Embodiment>

Figure 30:
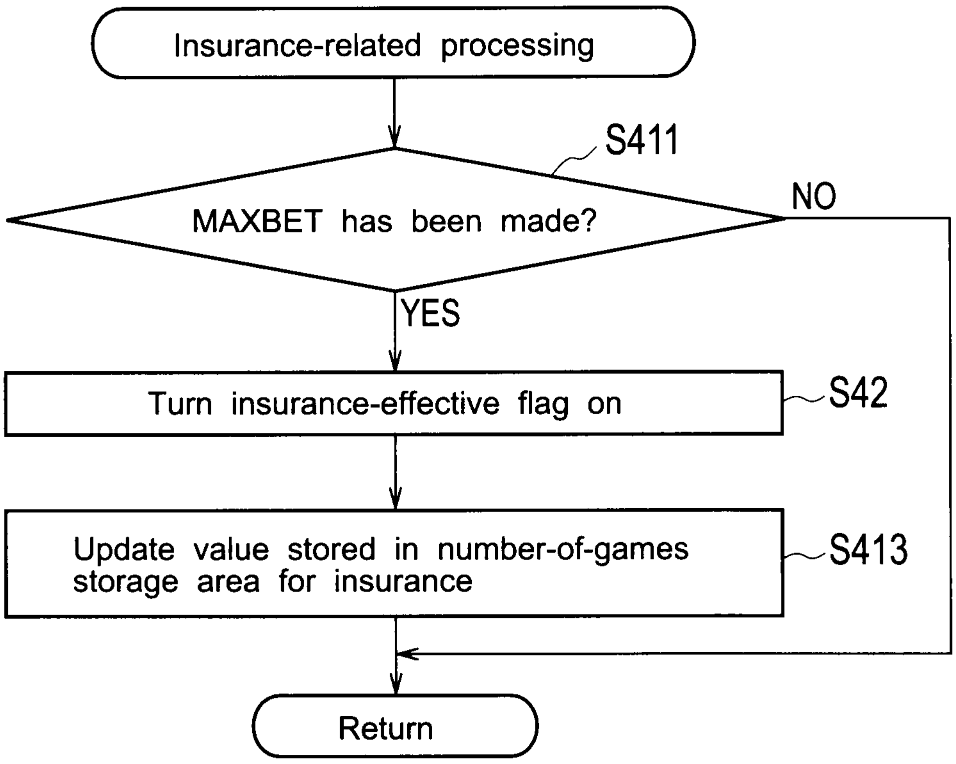
FIG. 30 is a view illustrating a flowchart of an insurance-related processing of a gaming machine according to a fourth embodiment of the present invention.

FIG. 30 is a view illustrating a flowchart of the insurance-related processing according to the fourth embodiment.

First, the main CPU 71 determines whether or not a MAXBET has been made (step S411). When the main CPU 71 determines that the MAXBET has been made, the main CPU 71 turns an insurance-effective flag on (step S412).

When the insurance-effective flag is turned off, the main CPU 71 completes the insurance-related processing. On the other hand, when the insurance-effective flag is turned on, the main CPU 71 updates a value stored in a number-of-games storage area for insurance provided in the RAM 73 (step S413). The number-of-games storage area for insurance is an area for storing the number of games up to the time of the payout by the insurance. In the processing of step S413, the main CPU 71 adds one to the value stored in the number-of-games storage area for insurance. After the processing, the insurance-related processing is completed. Specifically, when a MAXBET has been made, the insurance-effective flag is turned on, and the number of executions of normal games is counted.

<Insurance-Check Processing of the Fourth Embodiment>

Figure 31:
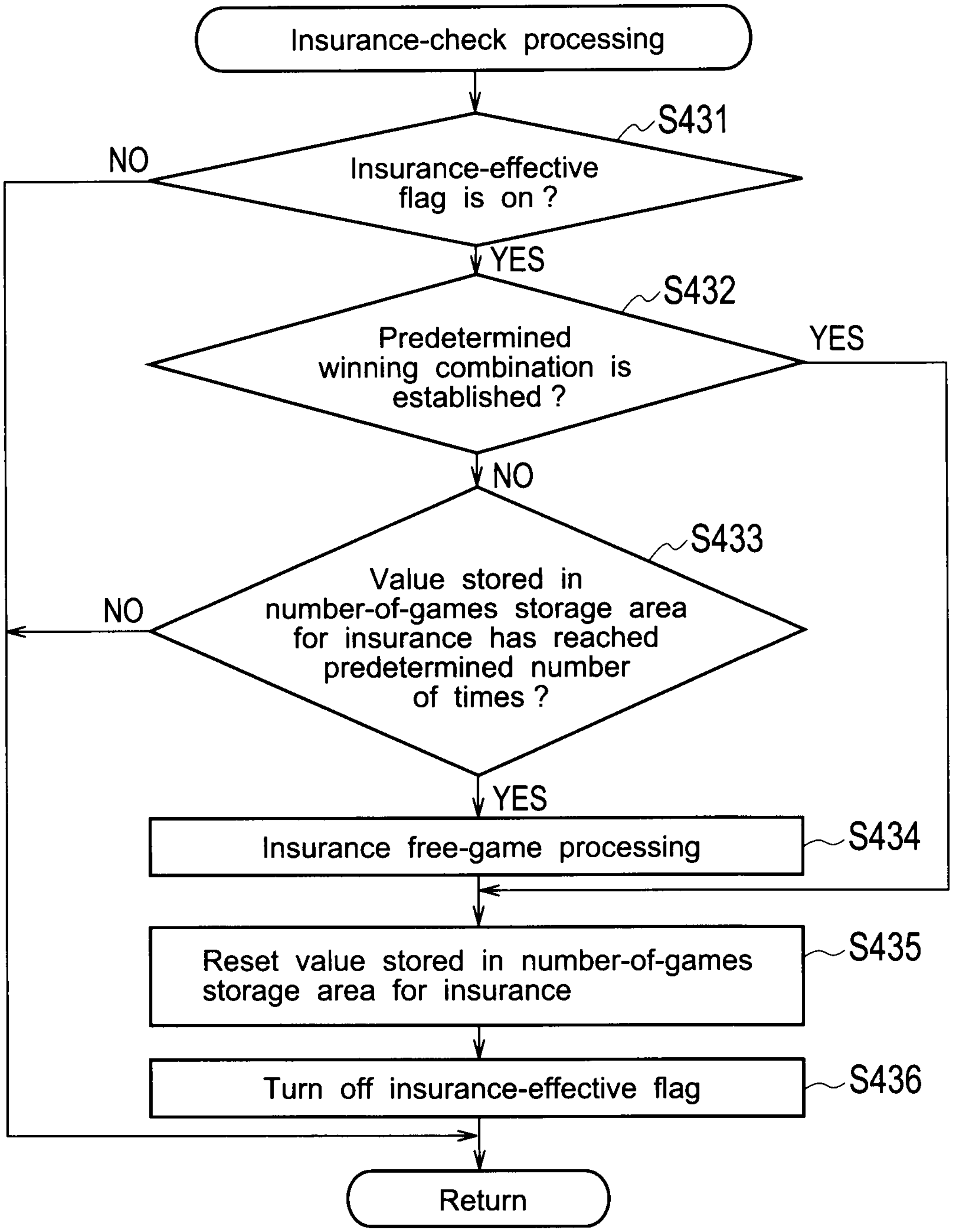
FIG. 31 is a view illustrating a flowchart of an insurance-check processing of the gaming machine according to the fourth embodiment of the present invention.

Next, the insurance-check processing according to the fourth embodiment is described. FIG. 31 is a view illustrating a flowchart of the insurance-check processing according to the fourth embodiment.

First, the main CPU 71 determines whether or not the insurance-effective flag is turned on (step S431). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S432). In the present embodiment, “free game trigger”, “jackpot” and “mystery bonus” are subjects of the predetermined winning combination.

When the main CPU 71 determines that the predetermined winning combination has not been established, the main CPU 71 determines whether or not the value stored in the number-of-games storage area for insurance has reached a predetermined number of times (e.g. 650) (step S433). When the main CPU 71 determines that the value stored in the number-of-games storage area for insurance has not reached the predetermined number of times, the main CPU 71 completes the insurance-check processing.

When the main CPU 71 determines that the value stored in the number-of-games storage area for insurance has reached the predetermined number of times, the main CPU 71 conducts insurance free-game processing (step S434).

After step S434 or when determining in step S432 that the predetermined winning combination has been established, the main CPU 71 resets the value stored in the number-of-games storage area for insurance (step S435). Next, the main CPU 71 turns the insurance-effective flag off (step S436). After processing, the insurance-check processing is completed.

<Free Game Processing of the Fourth Embodiment>

Figure 32:
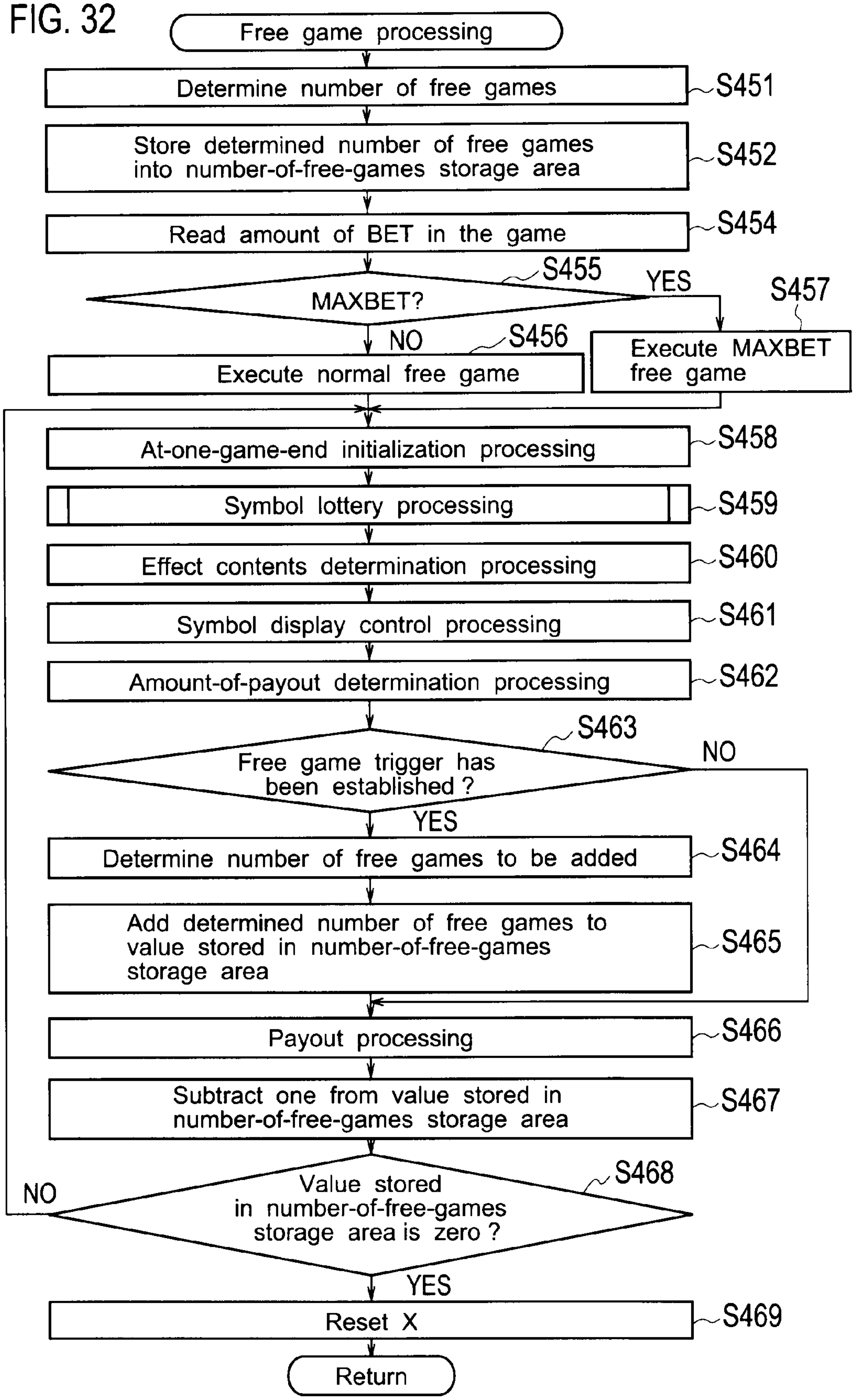
FIG. 32 is a view illustrating a flowchart of a free game processing of the gaming machine according to the fourth embodiment of the present invention.

Next, with reference to FIG. 32, the free game processing according to the fourth embodiment is described. FIG. 32 is a view illustrating a flowchart of the free game processing of the gaming machine according to the fourth embodiment of the present invention.

The main CPU 71 first determines the number of free games (step S451). The number of free games is determined by the game player operating the touch panel 114 as a selection switch and selecting any of the aforementioned selection screens shown in FIG. 24.

Next, the main CPU 71 stores the determined number of free games into a number-of-free-games storage area provided in the RAM 73 (step S452).

The main CPU 71 reads the amount of a BET on the game in which the free game trigger has been established (step S454). The main CPU 71 determines whether or not the amount of the BET on the game in which the free game trigger has been established is the MAXBET (step S455). When the main CPU 71 determines that the amount of the BET is not the MAXBET, the main CPU 71 executes a normal free game (step S456). In the normal free game, the main CPU 71 executes free games as feature games in the number set in step S451. On the other hand, when determining in step S455 that the amount of the BET is the MAXBET, the main CPU 71 executes a MAXBET bonus in which a special free game with more free games is added to a normal number of free games (step S457).

In other words, as shown in FIG. 36, as the benefit of entering into the feature game during MAXBET, for example, free games are added to the number of normal free games through random lottery processing.

The main CPU 71 then conducts at-one-game-end initialization processing in the same way as the processing of step S12 described with reference to FIG. 11 (step S458). The main CPU 71 then conducts the symbol lottery processing described with reference to FIG. 15 (step S459). Then, the main CPU 71 conducts the effect contents determination processing in the same way as the processing of step S16 described with reference to FIG. 11 (step S460). Next, the main CPU 71 conducts the symbol display control processing described with reference to FIG. 16 (step S461). The main CPU 71 then conducts the amount-of-payout determination processing described with reference to FIG. 17 (step S462).

Next, the main CPU 71 determines whether or not the free game trigger has been established (step S463). When the main CPU 71 determines that the free game trigger has been established, the main CPU 71 determines the number of free games to be added (step S464). In the same way as the aforementioned processing of step S451, the main CPU 71 determines the number of free games. The main CPU 71 then adds the determined number of free games to the value stored in the number-of-free-games storage area (step S465).

After the processing of step S465 or when determining in step S463 that the free game trigger has not been established, the main CPU 71 conducts the payout processing (step S466). In the payout processing, the main CPU 71 adds the value stored into the amount-of-payout storage area in the aforementioned amount-of-payout determination processing of step S462 to a value stored in an amount-of-payout storage area for free game. The amount-of-payout storage area for free game is an area for storing a total of the amounts of the payouts determined during the free games.

Upon the completion of the free game processing, the main CPU 71 adds the value stored in the amount-of-payout storage area for free game to the value stored in the number-of-credits storage area provided in the RAM 73, in the payout processing of step S24 described with reference to FIG. 11. That is, the total of the amounts of the payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S467). Next, the main CPU 71 determines whether or not the value stored in the number-of-free-games storage area is zero (step S468). When the main CPU 71 determines that the value stored in the number-of-free-games storage area is not zero, the main CPU 71 shifts the processing to step S458. On the other hand, when the main CPU 71 determines that the value stored in the number-of-free-games storage area is zero, the main CPU 71 resets the count value X indicating the number of games on which maximum BETs have been made (step S469), and completes the free game processing.

<Insurance Processing of the Fourth Embodiment>

Figure 33:
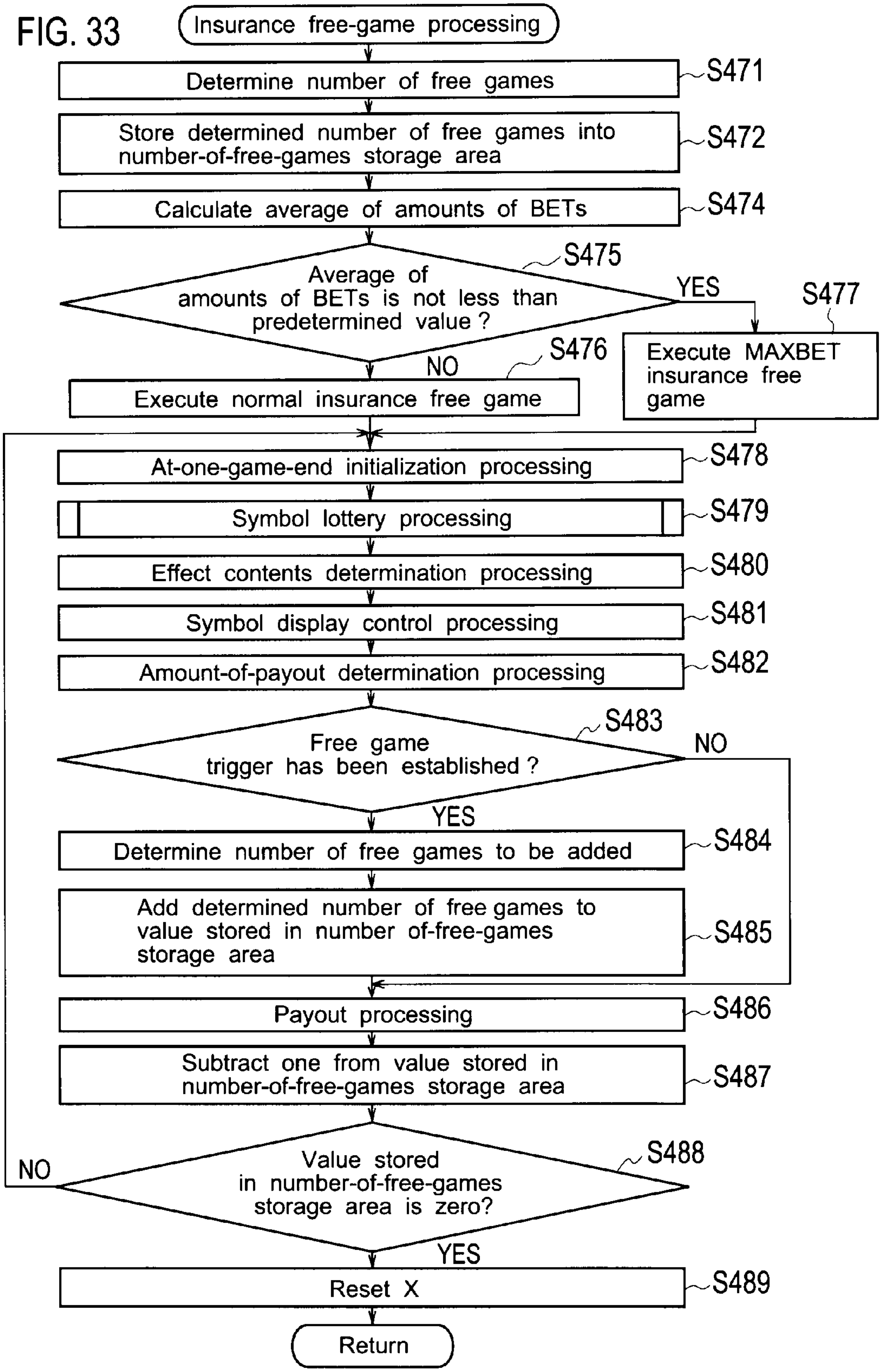
FIG. 33 is a view illustrating a flowchart of an insurance free-game processing of the gaming machine according to the fourth embodiment of the present invention.

Next, with reference to a flowchart shown in FIG. 33, insurance free-game processing according to the fourth embodiment is described.

Along with execution of a unit game, a count value of a counter is cumulatively incremented. Based on the count value data and an insurance start condition table, whether or not to start insurance is determined (see FIG. 31). When it is determined that the insurance is to be started, the first feature game is executed. Further, based on an outcome of the executed first feature game and the second feature game condition determination table, the conditions of the second feature game are determined. Thereafter, the second feature game is executed.

Further, when the insurance is started, the main CPU 71 first determines the number of free games (step S471). In the number-of-free-games determination processing, when the selection screens as shown in FIG. 24 is displayed, the game player operates the touch panel 114 to select two places as the selection switches, and thereby sets two numbers of free games.

Next, the main CPU 71 stores the determined numbers of free games into a number-of-free-games storage area provided in the RAM 73 (step S472).

The main CPU 71 calculates an average of the amounts of the BETs during normal games up to the time of establishment of the insurance (step S474).

The main CPU 71 determines whether or not the average of the amounts of the BETs has reached a predetermined value (e.g. 20) (step S475). When the main CPU 71 determines that the average of the amounts of the BETs has not reached the predetermined value, the main CPU 71 executes a normal insurance free-game. In the normal insurance free-game, a free game is executed using the reel pattern shown in FIG. 6 (step S476). On the other hand, when determining that the average of the amounts of the BETs has reached the predetermined value, the main CPU 71 executes a MAXBET insurance free-game.

In the calculation processing of step S474, the following calculation is performed, for example. It is assumed that Max Bet of the gaming machine is set to Bet Par Line 20 and the number of games to be played up to the start of rescue is set to 750 games. When a certain game player plays 749 games with Bet Par Line 20 and plays 1 game with Bet Par Line 10, an average multiplier is 19.987, namely 19.99 when rounded to two decimal places. The value 19.99 here is the average of the amounts of the BETs. When the predetermined value in the determination processing of step S475 is set to 20, which is the value of Max Bet in the gaming machine, a normal free game is executed without receiving the benefit of Max Bet Bonus since the average of the amounts of the BETs is not equal to or greater than 20.

Further, as another mode, assume that the gaming machine is configured to start a first stage of rescue at 750 games and then start a second stage of rescue at 400 games. Further assume that: a situation of making bets up to 750 games is the same as that mentioned above; a normal free game is executed since the first stage of rescue has not reached a predetermined value in step S475; thereafter, the number of games up to start of the next second stage of rescue is set to 400 games; and the game player plays all 400 games with BET PAR LINE 20. An average that is an average multiplier here is 19.991, which is obtained by dividing the calculated value of (750×20+10)+400×20 by the total number of games (750+400). This value is rounded to two decimal places by the calculation program to obtain an average of 20.00. When determination is made in the processing of step S475, the average is equal to or greater than the predetermined value 20, which leads to YES. Thus, the player can receive the benefit of MAXBET insurance free-game that is a special free game.

In the MAXBET insurance free-game, the number of "WILD" symbols is increased in at least one of the reels in the reel pattern shown in FIG. 6, and a free game is executed using the reel pattern with the number of "WILD" symbols increased (step S477). For example, the number of "WILD" symbols can be increased in the second, third and fourth reels or can be increased in all of the first to fifth reels.

The MAXBET free game is not limited to the ones described above. The present invention may be implemented in the following other modes for differentiation between the normal free game and the MAXBET free game, which is the special game, as disclosed in other embodiments. Specifically, the other modes include: a first other mode in which the number of free games in the MAXBET free game is set greater; and a second other mode in which the MAXBET free game is multiple sets of normal free games. In the case of the first other mode, the number of free games to be added to the normal number of free games may be determined by random lottery, or the fixed number of free games may be added. Alternatively, a number-of-additional-free-games determination game, in which the game player gets involved, may be executed, and the number of games to be added may be determined based on an outcome of the game.

The main CPU 71 then conducts at-one-game-end initialization processing in the same way as the processing of step S12 described with reference to FIG. 11 (step S478). The main CPU 71 then conducts the symbol lottery processing described with reference to FIG. 15 (step S479). Then, the main CPU 71 conducts the effect contents determination processing in the same way as the processing of step S16 described with reference to FIG. 11 (step S480). Next, the main CPU 71 conducts the symbol display control processing described with reference to FIG. 16 (step S481). The main CPU 71 then conducts the amount-of-payout determination processing described with reference to FIG. 17 (step S482).

Next, the main CPU 71 determines whether or not the free game trigger has been established (step S483). When the main CPU 71 determines that the free game trigger has been established, the main CPU 71 determines the number of free games to be added (step S484). In the same way as the aforementioned processing of step S471, the main CPU 71 determines the number of free games. The main CPU 71 then adds the determined number of free games to the value stored in the number-of-free-games storage area (step S485).

After the processing of step S485 or when determining in step S483 that the free game trigger has not been established, the main CPU 71 conducts the payout processing (step S486). In the payout processing, the main CPU 71 adds the value stored into the amount-of-payout storage area in the aforementioned amount-of-payout determination processing of step S482 to a value stored in an amount-of-payout storage area for free game. The amount-of-payout storage area for free game is an area for storing a total of the amounts of the payouts determined during the free games.

Upon the completion of the free game processing, the main CPU 71 adds the value stored in the amount-of-payout storage area for free game to the value stored in the number-of-credits storage area provided in the RAM 73, in the payout processing of step S24 described with reference to FIG. 11. That is, the total of the amounts of the payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S487). Next, the main CPU 71 determines whether or not the value stored in the number-of-free-games storage area is zero (step S488). When the main CPU 71 determines that the value stored in the number-of-free-games storage area is not zero, the main CPU 71 shifts the processing to step S487. On the other hand, when the main CPU 71 determines that the value stored in the number-of-free-games storage area is zero, the main CPU 71 resets the count value X indicating the number of games on which maximum BETs have been made (step S489), and completes the insurance free-game processing.

Thus, in the gaming machine according to the fourth embodiment, when "FEATURE" symbol is displayed and a free game trigger has been established, an average of the amounts of the BETs is calculated. When the calculated average reaches a predetermined value (for example, 20), a MAXBET free game is executed. On the other hand, when the calculated average does not reach the predetermined value, a normal free game is executed. Further, when the insurance has been established, an average of the amounts of the BETs is calculated. When the calculated average reaches a predetermined value, a MAXBET insurance free-game is executed. On the other hand, when the calculated average does not reach the predetermined value, a normal insurance free-game is executed.

Therefore, the larger the amount of a BET in one normal game, the higher the probability of winning a large amount of payout in the free game executed when the free game trigger is established and in the insurance free-game executed when the insurance is established. Thus, the player is allowed to have interest in making a MAXBET.

[Fifth Embodiment]

Next, a fifth embodiment of the present invention is described. The fifth embodiment is different from the aforementioned fourth embodiment in the insurance free-game processing shown in FIG. 33.

<Insurance Free-Game Processing of the Fifth Embodiment>

Figure 34:
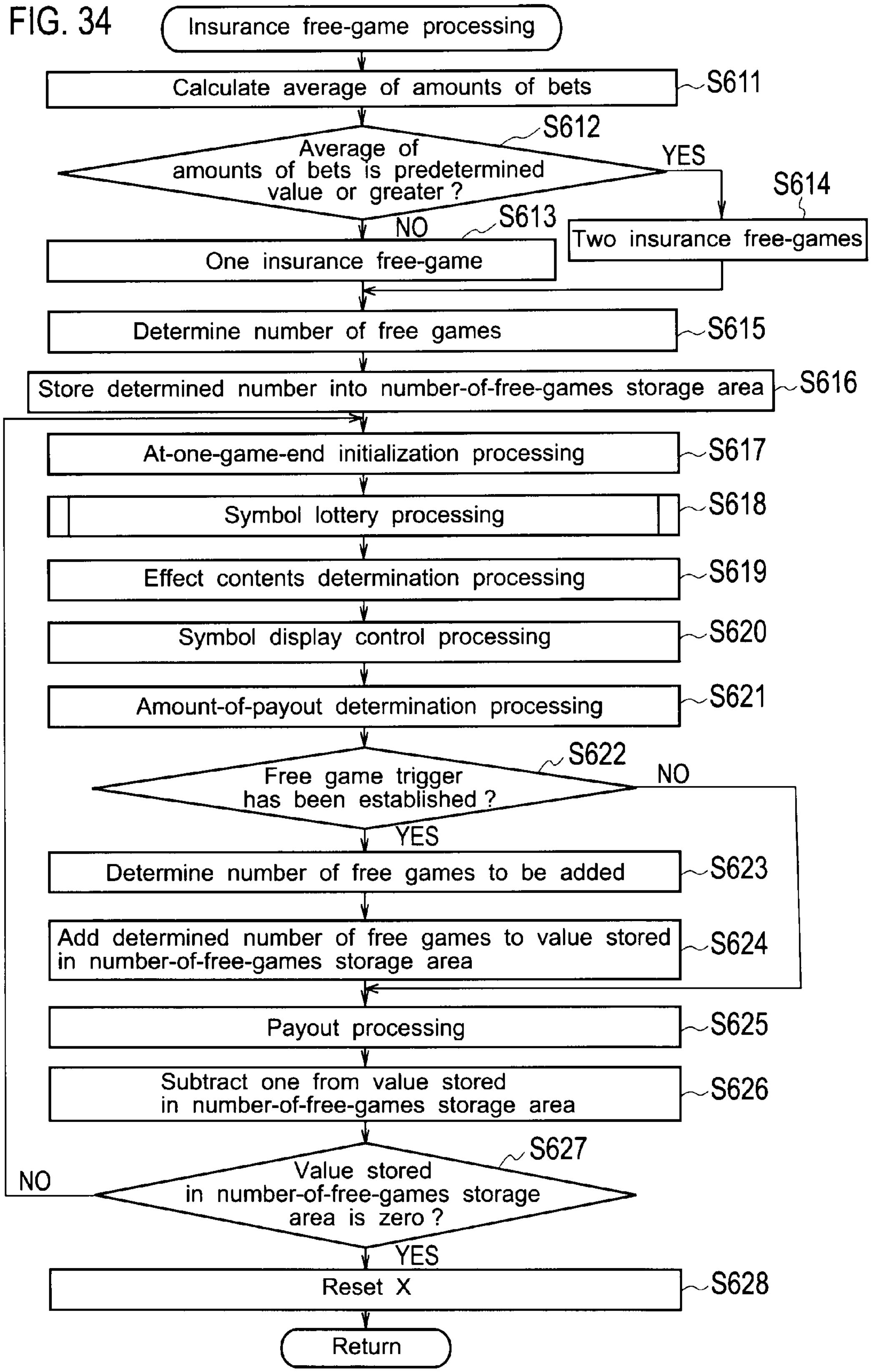
FIG. 34 is a view illustrating a flowchart of an insurance free-game processing of a gaming machine according to a fifth embodiment of the present invention.

With reference to a flowchart shown in FIG. 34, insurance free-game processing according to the fifth embodiment is described below.

First, the main CPU 71 calculates an average of the amounts of BETs during normal games up to the time of establishment of the insurance (step S611).

The main CPU 71 then determines whether or not the calculated average has reached a predetermined value (e.g. 20) (step S612). When determining that the average has not reached the predetermined value, the main CPU 71 selects a one-round insurance free-game (step S613). On the other hand, when determining that the average has reached the predetermined value, the main CPU 71 selects a two-round insurance free-game (step S614).

The one-round insurance free-game and the two-round insurance free-game are different from each other in the following point. Specifically, in the one-round insurance free-game, an insurance free-game including a set of a predetermined number of free games is executed once. Meanwhile, in the two-round insurance free-game, the set is executed twice consecutively.

The main CPU 71 determines the number of free games to be executed in each of the insurance free-games (step S615). The main CPU 71 extracts a random value for number-of-free-games determination, and determines any one of the various numbers of free games by lottery.

Next, the main CPU 71 stores the determined number of free games into the number-of-free-games storage area provided in the RAM 73 (step S616).

The main CPU 71 then conducts at-one-game-end initialization processing in the same way as the processing of step S12 described with reference to FIG. 11 (step S617). The main CPU 71 then conducts the symbol lottery processing described with reference to FIG. 15 (step S618). Then, the main CPU 71 conducts the effect contents determination processing in the same way as the processing of step S16 described with reference to FIG. 11 (step S619). Next, the main CPU 71 conducts the symbol display control processing described with reference to FIG. 16 (step S620). The main CPU 71 then conducts the amount-of-payout determination processing described with reference to FIG. 17 (step S621).

Next, the main CPU 71 determines whether or not the free game trigger has been established (step S622). When the main CPU 71 determines that the free game trigger has been established, the main CPU 71 determines the number of free games to be added (step S623). In the same way as the aforementioned processing of step S615, the main CPU 71 determines the number of free games. The main CPU 71 then adds the determined number of free games to the value stored in the number-of-free-games storage area (step S624).

After the processing of step S624 or when determining in step S622 that the free game trigger has not been established, the main CPU 71 conducts the payout processing (step S625). In the payout processing, the main CPU 71 adds the value stored into the amount-of-payout storage area in the aforementioned amount-of-payout determination processing of step S621 to a value stored in the amount-of-payout storage area for free games. The amount-of-payout storage area for free games is an area for storing a total of the amounts of payouts determined during the free games.

Upon completion of the free game processing, the main CPU 71 adds the value stored in the amount-of-payout storage area for free games to the value stored in the number-of-credits storage area provided in the RAM 73, in the payout: processing of step S24 described with reference to FIG. 11. That is, the total of the amounts of payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S626). Next, the main CPU 71 determines whether or not the value stored in the number-of-free-games storage area is zero (step S627). When the main CPU 71 determines that the value stored in the number-of-free-games storage area is not zero, the main CPU 71 shifts the processing to step S617. On the other hand, when the main CPU 71 determines that the value stored in the number-of-free-games storage area is zero, the main CPU 71 resets the count value X indicating the number of games on which maximum BETs have been made (step S628), and completes the insurance free-game processing.

In this way, in the gaming machine according to the fifth embodiment, when the insurance is established, an average of the amounts of BETs is calculated. When the calculated average has reached a predetermined value, a two-round insurance free-game is executed. On the other hand, when the calculated average has not reached the predetermined value, a one-round insurance free-game is executed.

Therefore, the larger the amounts of BETs in the normal games executed before the insurance is established, the larger the number of free games to be executed and the higher the probability of winning a large amount of payout. Thus, the player is allowed to have interest in making a MAXBET.

[Sixth Embodiment]

Next, a sixth embodiment of the present invention is described. The sixth embodiment is different from the aforementioned fourth embodiment in the free game processing shown in FIG. 32 and the insurance free-game processing shown in FIG. 33. The free game processing and insurance free-game processing according to the sixth embodiment are described below.

<Free Game Processing of the Sixth Embodiment>

Figure 35:
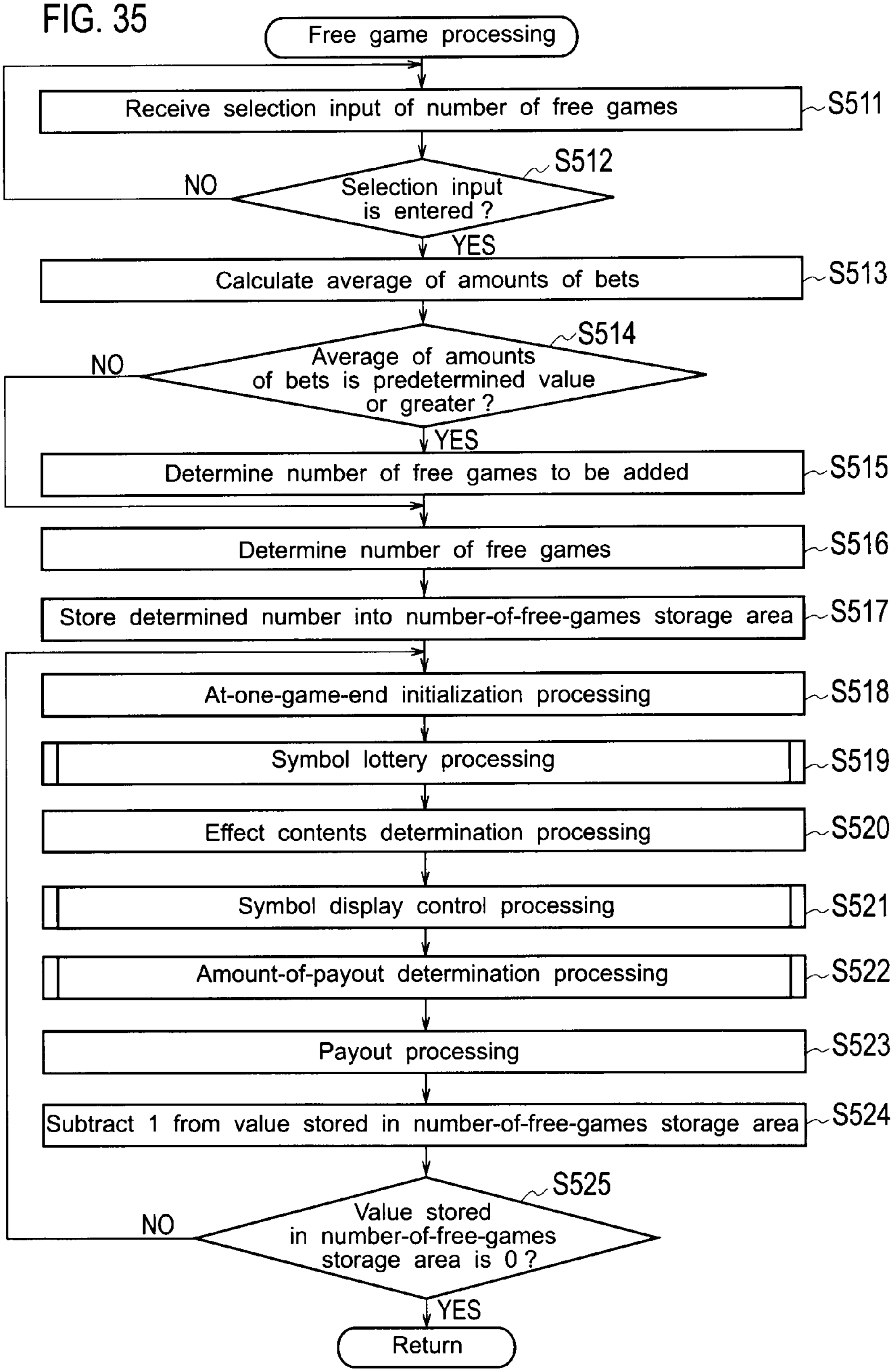
FIG. 35 is a view illustrating a flowchart of a free game processing of a gaming machine according to a sixth embodiment of the present invention.

FIG. 35 is a view illustrating a flowchart of the free game processing for the gaming machine according to the sixth embodiment of the present invention.

First, the main CPU 71 receives a selection input of the number of free games (step S511). In this processing, as shown in FIG. 24, selection screens respectively showing different numbers of free games are displayed in the symbol display region 4 of the lower image display panel 141, and an operation input entered by a player is received. In the example shown in FIG. 24, five selection screens respectively for twenty, fifteen, ten, eight, and five games are displayed in the symbol display region 4, and the player can select any one of the selection screens.

It is to be noted that multiple types of multiplication factors are set for each of the numbers of free games, and any one of the multiplication factors is selected. When a winning combination is established, the amount of payout is multiplied by the selected multiplication factor. For example, when the number of free games selected is twenty, one multiplication factor is selected from three types of multiplication factors, namely 2, 3 and 5. When a winning combination is established, the amount of payout is multiplied by the selected multiplication factor.

When the number of free games selected is fifteen, a multiplication factor is arbitrarily selected from three types of multiplication factors, namely 3, 5 and 8. When the number of free games selected is ten, a multiplication factor is arbitrarily selected from three types of multiplication factors, namely 5, 8 and 10. When the number of free games selected is eight, a multiplication factor is arbitrarily selected from three types of multiplication factors, namely 8, 10 and 15. When the number of free games selected is five, a multiplication factor is arbitrarily selected from three types of multiplication factors, namely 10, 15 and 30. In other words, the smaller the number of free games is, the higher the multiplication factor of a payout is.

The main CPU 71 determines whether or not an operation input has been entered by the player (step S512).

When determining that the operation input has been entered by the player, the main CPU 71 calculates an average of the amounts of BETs during execution of normal games (step S513).

The main CPU 71 determines whether or not the average of the amounts of BETs has reached a predetermined value (step S514). When determining that the average of the amount of BETs has reached the predetermined value, the main CPU 71 determines the number of free games to be added by lottery. FIG. 36 is a view illustrating a lottery table for determining the number of games to be added. When the number of free games selected is twenty, one game is added with a probability of 5%, two games are added with a probability of 14%, three games are added with a probability of 31%, and five games are added with a probability of 50%. Here, an average of the numbers of games is 3.8 games. Further, when determining in step S514 of FIG. 35 that the average of the amounts of BETs has not reached the predetermined value, the processing of adding free games is not conducted.

The main CPU 71 determines the number of free games to be executed (step S516).

The main CPU 71 stores the determined number of free games into the number-of-free-games storage area provided in the RAM 73 (step S517).

The main CPU 71 then conducts at-one-game-end initialization processing in the same way as the processing of step S12 described with reference to FIG. 11 (step S518). The main CPU 71 then conducts the symbol lottery processing described with reference to FIG. 15 (step S519). In this case, the symbol lottery processing is conducted using the video reels including the symbol arrays shown in FIG. 7. Specifically, unlike the normal game, symbol arrays including WILD symbols are used in the free game.

Then, the main CPU 71 conducts the effect contents determination processing in the same way as the processing of step S16 described with reference to FIG. 11 (step S520). Next, the main CPU 71 conducts the symbol display control processing described with reference to FIG. 16 (step S521). The main CPU 71 then conducts amount-of-payout determination processing (step S522).

The main CPU 71 conducts payout processing (step S523). In the payout processing, the main CPU 71 adds the value stored into the amount-of-payout storage area in the aforementioned amount-of-payout determination processing of step S319 to a value stored in the amount-of-payout storage area for free games. The amount-of-payout storage area for free games is an area for storing a total of the amounts of payouts determined during the free games.

Upon completion of the free game processing, the main CPU 71 adds the value stored in the amount-of-payout storage area for free games to the value stored in the number-of-credits storage area provided in the RAM 73, in the payout processing of step S24 described with reference to FIG. 11. That is, the total of the amounts of payouts determined during the free games is collectively paid out. It is to be noted that coins may be discharged from the coin payout exit 15A, or a ticket with a barcode may be issued.

Next, the main CPU 71 subtracts one from the value stored in the number-of-free-games storage area (step S524). Next, the main CPU 71 determines whether or not the value stored in the number-of-free-games storage area is zero (step S525). When the main CPU 71 determines that the value stored in the number-of-free-games storage area is not zero, the main CPU 71 shifts the processing to step S518. On the other hand, when the main CPU 71 determines that the value stored in the number-of-free-games storage area is zero, the main CPU 71 completes the free game processing.

<Insurance Free-Game Processing of the Sixth Embodiment>

Figure 37:
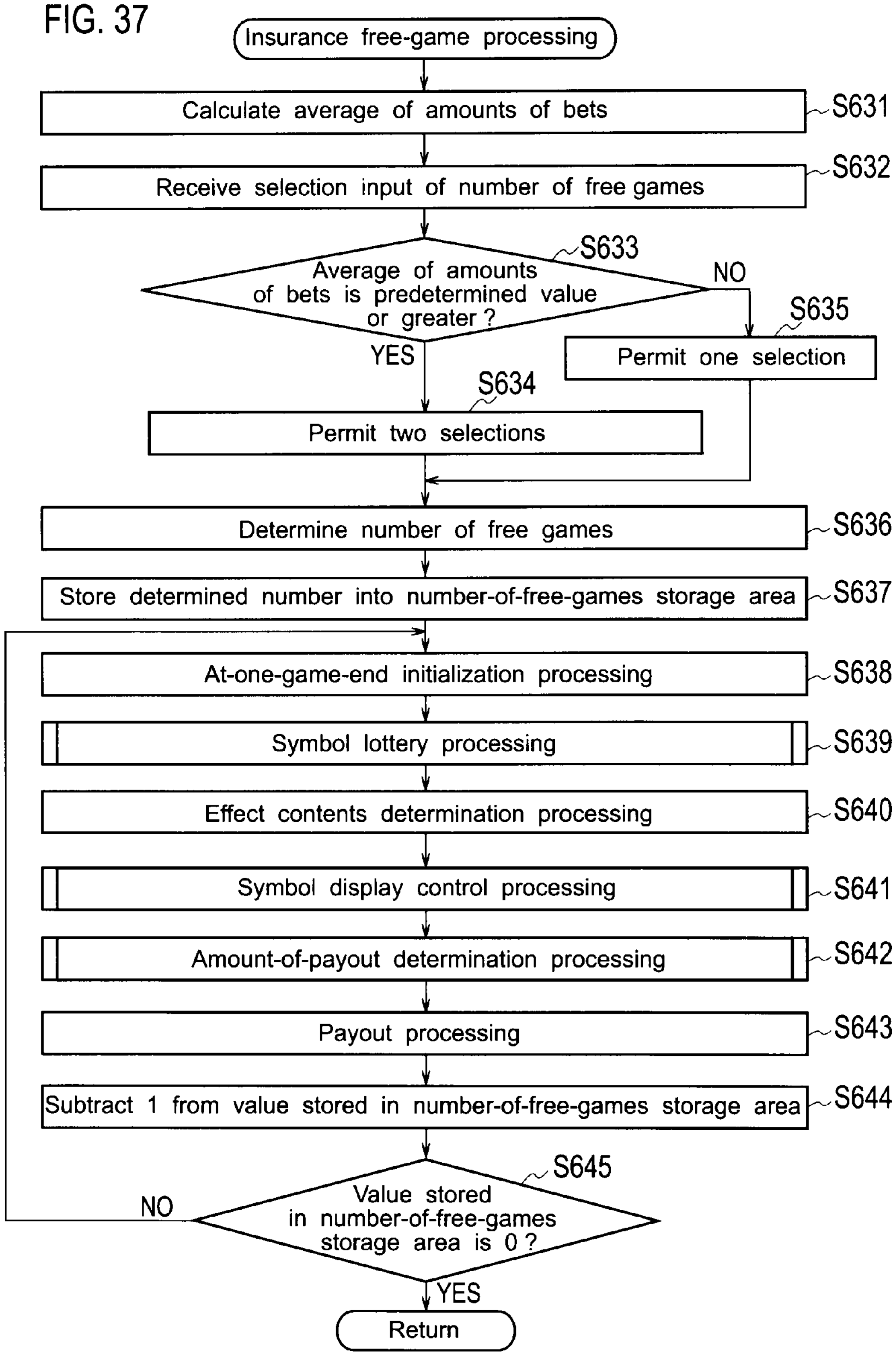
FIG. 37 is a view illustrating a flowchart of an insurance free-game processing of the gaming machine according to the sixth embodiment of the present invention.

With reference to a flowchart shown in FIG. 37, insurance free-game processing according to the sixth embodiment is described below.

First, the main CPU 71 calculates an average of the amounts of BETs in normal games executed up to the time of establishment of the insurance (step S631).

Next, the main CPU 71 receives a selection input of the number of free games (step S632). In this processing, as shown in FIG. 24, selection screens respectively showing different numbers of free games are displayed in the symbol display region 4 of the lower image display panel 141, and an operation input entered by a player is received. In the example shown in FIG. 24, five selection screens respectively for twenty, fifteen, ten, eight and five games are displayed in the symbol display region 4, and the player can select any one of the selection screens.

It is to be noted that multiple types of multiplication factors are set for each of the numbers of free games, and any one of the multiplication factors is selected. When a winning combination is established, the amount of payout is multiplied by the selected multiplication factor. For example, when the number of free games selected is twenty, one multiplication factor is selected from three types of multiplication factors, namely 2, 3 and 5. When a winning combination is established, the amount of payout is multiplied by the selected multiplication factor.

Further, when the number of free games selected is fifteen, a multiplication factor is arbitrarily selected from three types of multiplication factors, namely 3, 5 and 8. When the number of free games selected is ten, a multiplication factor is arbitrarily selected from three types of multiplication factors, namely 5, 8 and 10. When the number of free games selected is eight, a multiplication factor is arbitrarily selected from three types of multiplication factors, namely 8, 10 and 15. When the number of free games selected is five, a multiplication factor is arbitrarily selected from three types of multiplication factors, namely 10, 15 and 30. In other words, the smaller the number of free games is, the higher the multiplication factor of a payout is.

The main CPU 71 determines whether or not the average obtained in the processing of step S631 has reached a predetermined value (step S633). When determining that the average has reached the predetermined value, the main CPU 71 permits two number-of-free-games selection inputs (step S634). Specifically, the player is allowed to select two numbers of free games that he/she desires from the selection screens shown in FIG. 24. Therefore, for example, a two-round insurance free-game such as "fifteen games" and "five games" can be selected, and these insurance free-games are executed.

On the other hand, when determining that the average has not reached the predetermined value, the main CPU 71 permits one number-of-free-games selection input (step S635).

The main CPU 71 determines the number of free games to be executed, based on the processing of S634 or S635 (step S636).

Next, the main CPU 71 stores the determined number of free games into the number-of-free-games storage area provided in the RAM 73 (step S637).

The main CPU 71 then conducts at-one-game-end initialization processing in the same way as the processing of step S12 described with reference to FIG. 11 (step S638). The main CPU 71 then conducts the symbol lottery processing described with reference to FIG. 15 (step S639). In this case, the symbol lottery processing is conducted using the video reels including the symbol arrays shown in FIG. 7. Specifically, unlike the normal game, symbol arrays including WILD symbols are used in the free game.

Then, the main CPU 71 conducts the effect contents determination processing in the same way as the processing of step S16 described with reference to FIG. 11 (step S640). Next, the main CPU 71 conducts the symbol display control processing described with reference to FIG. 16 (step S641). The main CPU 71 then conducts amount-of-payout determination processing (step S642).

The main CPU 71 conducts payout processing (step S643). In the payout processing, the main CPU 71 adds the value stored into the amount-of-payout storage area in the aforementioned amount-of-payout determination processing of step S642 to a value stored in the amount-of-payout storage area for free games. The amount-of-payout storage area for free games is an area for storing a total of the amounts of payouts determined during the free games.

Next, the main CPU 71 subtracts one from the value stored in the number-of-free-games storage area (step S644). Next, the main CPU 71 determines whether or not the value stored in the number-of-free-games storage area is zero (step S645). When the main CPU 71 determines that the value stored in the number-of-free-games storage area is not zero, the main CPU 71 shifts the processing to step S638. On the other hand, when the main CPU 71 determines that the value stored in the number-of-free-games storage area is zero, the main CPU 71 completes the insurance free-game processing.

Thus, in the gaming machine according to the sixth embodiment, when "FEATURE" symbol has been displayed and a free game trigger has been established, an average of the amounts of BETs is calculated. When the calculated average has reached a predetermined value, a predetermined number of free games are added in the selection of the desired number of free games.

Further, when the insurance is established, an average of the amounts of BETs is calculated. When the calculated average has reached a predetermined value, the number of the insurance free-game can be selected twice. Thus, more free games can be executed.

Therefore, the larger the amount of BET in one normal game, the larger the number of free games executed during the free games executed when the free game trigger is established and during the insurance free-games executed when the insurance is established. Thus, the player is allowed to have interest in making a MAXBET.

The video reels 3 of the gaming machine 1 may include an arrangement of symbols illustrated in FIG. 38.

In the gaming machine and the method for controlling the gaming machine according to the present invention, when N of the same symbols are displayed, a maximum of one special symbol is displayed. Accordingly, the maximum winning combination is (N+1)KIND. Therefore, the player is allowed to have expectations of winning a large amount of payouts. Thus, a gaming machine with new entertainment properties can be provided.

While the gaming machine and the method for controlling the gaming machine according to the present invention have been described based on the illustrated embodiments, the present invention is not limited thereto, and the configuration of each part may be replaced with any other configuration having the same function.

What is claimed is:

1. A gaming machine comprising:

an input device configured to receive a bet for each of unit games;

a display having M rows and N columns of display regions;

a memory configured to store data on N symbol arrays; and a controller, wherein each of the N symbol arrays has S rows of symbol regions, each of the symbol regions includes any one of a plurality of first symbols or a special symbol, the plurality of first symbols do not include the special symbol, and the N symbol arrays meet following conditions (A) to (D):

(A) S is larger than M, (B) when symbol regions on upper and lower ends of each symbol array are connected in a loop, in each symbol array, symbol regions within (M−1) rows above and (M−1) rows below a symbol region including a certain first symbol do not include another occurrence of the certain first symbol, (C) each of at least two of the symbol arrays include the second symbol, and (D) when the symbol regions on the upper and lower ends of each symbol array are connected in a loop, in any one of the at least two symbol arrays, first symbols included in symbol regions within (M−1) rows above and (M−1) rows below a symbol region including the special symbol do not occur in symbol regions within (M−1) rows above and (M−1) rows below a symbol region including the special symbol of the other at least two symbol arrays, and the controller is configured to (a) execute a unit game in which a portion of the symbol arrays is displayed in the display regions while being scrolled in a loop pattern and then stopped and displayed so that symbols are displayed in all the respective display regions, and (b) generate a payout based on same first symbols stopped and displayed in the respective display regions or a combination of first symbols and at least one special symbol stopped and displayed in the respective display regions.

2. The gaming machine according to claim 1, wherein the controller is configured to generate a payout based on a number of the at least one special symbol stopped and displayed in the display regions, and a number of same first symbols stopped and displayed consecutively from any one of a far left column and a far right column of the N columns of display regions toward the other.

3. The gaming machine according to claim 1, wherein the special symbol is not included in the symbol arrays displayed in far left and far right display regions in the N symbol arrays.

4. The gaming machine according to claim 1, wherein the controller is configured to provide the payout generated in the (b).

5. A gaming machine comprising:

an input device configured to receive a bet for each of unit games;

a display having three rows and five columns of display regions;

a memory configured to store data on five symbol arrays; and a controller, wherein each of the five symbol arrays has S rows of symbol regions, each of the symbol regions includes any one of a plurality of first symbols or a special symbol, the plurality of first symbols do not include the special symbol, and the five symbol arrays meet following conditions (A) to (D):

(A) S is larger than 3, (B) when symbol regions on upper and lower ends of each symbol array are connected in a loop, in each symbol array, symbol regions within two rows above and two rows below a symbol region including a certain first symbol do not include another occurrence of the certain first symbol, (C) each of at least two of the symbol arrays include the special symbol, and (D) when the symbol regions on the upper and lower ends of each symbol array are connected in a loop, in any one of the at least two symbol arrays, first symbols included in symbol regions within two rows above and two rows below a symbol region including the special symbol do not occur in symbol regions within two rows above and two rows below a symbol region including the special symbol of the other at least two symbol arrays, and the controller is configured to (a) execute a unit game in which a portion of the symbol arrays is displayed in the display regions while being scrolled in a loop pattern and then stopped and displayed so that symbols are displayed in all the respective display regions, and (b) generate a payout based on same first symbols stopped and displayed in the respective display regions or a combination of first symbols and at least one special symbol stopped and displayed in the respective display regions.

6. The gaming machine according to claim 5, wherein the controller is configured to generate a payout based on a number of the at least one special symbol stopped and displayed in the display regions, and a number of same first symbols stopped and displayed consecutively from any one of a far left column and a far right column of the N columns of display regions toward the other.

7. The gaming machine according to claim 5, wherein the special symbol is not included in the symbol arrays displayed in far left and far right display regions in the five symbol arrays.

8. The gaming machine according to claim 5, wherein the controller is configured to provide the payout generated in the (b).

9. A method for controlling a gaming machine, the method comprising: by a controller, displaying N symbol arrays being scrolled in a loop pattern in M rows and N columns of display regions, wherein each of the N symbol arrays has S rows of symbol regions and each of the symbol regions includes any one of a plurality of first symbols or a special symbol, and the plurality of first symbols do not include the special symbol;

after displaying a portion of the symbol arrays being scrolled, stopping and displaying the symbol arrays so that symbols are displayed in all the respective display regions; and generating a payout based on same first symbols stopped and displayed in the respective display regions or a combination of first symbols and at least one special symbol stopped and displayed in the respective display regions, wherein the N symbol arrays meet following conditions (A) to (D):

(A) S is larger than M, (B) when symbol regions on upper and lower ends of each symbol array are connected in a loop, in each symbol array, symbol regions within (M−1) rows above and (M−1) rows below a symbol region including a certain first symbol do not include another occurrence of the certain first symbol, (C) each of at least two of the symbol arrays include the special symbol, and (D) when the symbol regions on the upper and lower ends of each symbol array are connected in a loop, in any one of the at least two symbol arrays, first symbols included in symbol regions within (M−1) rows above and (M−1) rows below a symbol region including the special symbol do not occur in symbol regions within (M−1) rows above and (M−1) rows below a symbol region including the special symbol of the other at least two symbol arrays.

10. The method according to claim 9, wherein in the step of generating a payout, the payout is generated based on a number of the at least one special symbol stopped and displayed in the display regions, and a number of same first symbols stopped and displayed consecutively from any one of a far left column and a far right column of the N columns of display regions toward the other.

11. The method according to claim 9, wherein the special symbol is not included in the symbol arrays displayed in far left and far right display regions in the N symbol arrays.

12. A method for controlling a gaming machine, the method comprising: by a controller, displaying five symbol arrays being scrolled in a loop pattern in three rows and five columns of display regions, wherein each of the five symbol arrays has S rows of symbol regions and each of the symbol regions includes any one of a plurality of first symbols or a special symbol, and the plurality of first symbols do not include the special symbol;

after displaying a portion of the symbol arrays being scrolled, stopping and displaying the symbol arrays so that symbols are displayed in all the respective display regions; and generating a payout based on same first symbols stopped and displayed in the respective display regions or a combination of first symbols and at least one special symbol stopped and displayed in the respective display regions, wherein the five symbol arrays meet following conditions (A) to (D):

(A) S is larger than 3, (B) when symbol regions on upper and lower ends of each symbol array are connected in a loop, in each symbol array, symbol regions within two rows above and two rows below a symbol region including a certain first symbol do not include another occurrence of the certain first symbol, (C) each of at least two of the symbol arrays include the special symbol, and (D) when the symbol regions on the upper and lower ends of each symbol array are connected in a loop, in any one of the at least two symbol arrays, first symbols included in symbol regions within two rows above and two rows below a symbol region including the special symbol do not occur in symbol regions within two rows above and two rows below a symbol region including the special symbol of the other at least two symbol arrays.

13. The method according to claim 12, wherein in the step of generating a payout, the payout is generated based on a number of the at least one special symbol stopped and displayed in the display regions, and a number of same first symbols stopped and displayed consecutively from any one of a far left column and a far right column of the N columns of display regions toward the other.

14. The method according to claim 12, wherein the special symbol is not included in the symbol arrays displayed in far left and far right display regions in the five symbol arrays.

* * * * *